(12) United States Patent
Ruellan et al.

(10) Patent No.: US 9,015,269 B2
(45) Date of Patent: Apr. 21, 2015

(54) METHODS AND SYSTEMS FOR NOTIFYING A SERVER WITH CACHE INFORMATION AND FOR SERVING RESOURCES BASED ON IT

(75) Inventors: Herve Ruellan, Rennes (FR); Youenn Fablet, La Dominelais (FR); Romain Bellessort, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 13/527,329

(22) Filed: Jun. 19, 2012

(65) Prior Publication Data
US 2013/0339472 A1   Dec. 19, 2013

(51) Int. Cl.
*G06F 15/167* (2006.01)
*H04L 29/08* (2006.01)

(52) U.S. Cl.
CPC .................................. *H04L 67/2842* (2013.01)

(58) Field of Classification Search
USPC .................. 709/214; 707/3, 10, 740; 455/466
See application file for complete search history.

(56) References Cited

U.S. PATENT DOCUMENTS

| | | | |
|---|---|---|---|
| 7,155,243 B2 * | 12/2006 | Baldwin et al. | 455/466 |
| 2002/0198616 A1 * | 12/2002 | Crampton et al. | 700/99 |
| 2003/0126136 A1 * | 7/2003 | Omoigui | 707/10 |
| 2007/0038610 A1 * | 2/2007 | Omoigui | 707/3 |
| 2008/0162498 A1 * | 7/2008 | Omoigui | 707/10 |
| 2010/0070448 A1 * | 3/2010 | Omoigui | 706/47 |
| 2012/0191716 A1 * | 7/2012 | Omoigui | 707/740 |
| 2013/0339472 A1 * | 12/2013 | Ruellan et al. | 709/214 |

* cited by examiner

*Primary Examiner* — Tammy Nguyen
(74) *Attorney, Agent, or Firm* — Canon USA, Inc., IP Division

(57) ABSTRACT

The present invention relates to the notification of a server device with the availability of resources in cache memories of a client device and to the serving of digital resources in such a client-server communication system. The notifying method comprises: obtaining a first list of resources available in the cache memories of the client device; filtering the first list according to filtering criteria relating to a resource parameter, to obtain a filtered list of fewer resources available in the client device or splitting the first list according to splitting criteria relating to a resource parameter, to obtain a plurality of sub-lists of resources available in the client device; and notifying the server device with data structures representing the filtered list or sub-lists of resources.

18 Claims, 5 Drawing Sheets

METHODS AND SYSTEMS FOR NOTIFYING A SERVER WITH CACHE INFORMATION AND FOR SERVING RESOURCES BASED ON IT

FIELD OF THE INVENTION

The present invention relates in general to the use of cache information in network communication and in particular, to the notification of a server device with the availability of resources in cache memories of a client device and to the serving of digital resources in such a client-server communication system.

BACKGROUND OF THE INVENTION

Information about the availability of resources in a communication device is currently used to optimize exchange of digital resources between communication devices. It is referred to below as cache information.

This is for example the case for caching web proxies that work cooperatively. Each caching web proxy caches a set of digital resources in cache memories and shares its cache information with the other caching web proxies. Then, when a caching web proxy receives a request for a digital resource not stored in its cache memories, it can use the information about the availability of resources in the other caching web proxies to select one of them to handle the request, avoiding requesting each of the other caching web proxies.

Cache information about the availability of resources in a communication device is generally implemented through a Bloom filter.

A Bloom filter is a compact data structure for a probabilistic representation of a set of elements. In the example above, the elements are the digital resources hosted by the communication device.

Bloom filter theory is for example disclosed in "*Less hashing, same performance: Building a better bloom filter*" (A. Kirsch and M. Mitzenmacher, Random Structures & Algorithms 33, no. 2 (2008), pp. 187-218).

A Bloom filter representing a set enables to check whether an element is member of the set. For an element member of the set, the Bloom filter will always return the correct result, i.e. that the element is a member of the set. That means that false negatives are not possible. However, for an element not member of the set, the Bloom filter may wrongly return, with low probability, that the element is a member of the set. That means that false positives are possible. The probability for a Bloom filter to return a false positive is its error rate.

A Bloom filter of size m is composed of k hash functions having values in the range [0,m−1] and of an array of m Boolean values. m should be greater than k, generally m>>k. For example m=18 and k=3.

To store an element, such as a digital resource, in the Bloom filter, the k hash functions are applied to it to obtain k hash values $v_1, \ldots, v_k$. Then, for each value $v_i$, the corresponding Boolean value in the array is set to 'true', i.e. the Boolean value having the index $v_i$ in the array: in other words, the Boolean value at index $v_1$ in the array is set to 'true'; the Boolean value at index $v_2$ in the array is set to 'true'; and so on.

Another element may be added to the Bloom filter by again setting the Boolean values at index $v_i$ (calculated for that specific element) to 'true'. Of course, some of these Boolean values may already be set to 'true' due to the previous addition of others elements.

Based on a Bloom filter so constructed, the presence of an element in the set represented by the Bloom filter can be tested. To do so, the k hash functions are applied to the element to test, to obtain k hash values $v_1, \ldots, v_k$. Then, for each value $v_i$, the corresponding Boolean value in the array (Boolean value at index $v_i$) is retrieved.

If all Boolean values at index $v_i$ (i=1 . . . k) have the value 'true', then the Bloom filter returns that the element to test belongs to the set it represents. However, there is a probability that this result is false: a Bloom filter can return a false positive. This is because the Boolean values at index $v_i$ (i=1 . . . k) for the tested element can have been set to 'true' to represent several elements members of the set. In general, with a correctly configured Bloom filter, the rate or probability of false positive is quite low.

Otherwise (if any one of these Boolean values is not 'true'), the Bloom filter returns that the element to test does not belong to the set its represents. In such a case, the result is always correct: a Bloom filter never returns a false negative. This is because if at least one of the Boolean values is not 'true', then the tested element has not been added to the Bloom filter.

An issue regards the probability of false positive, i.e. of error that an element is detected to be in the set whereas it is not in the set.

A mathematical study of Bloom filters shows that the probability of false positive for a Bloom filter storing n elements is roughly equal to:

$$p \approx (1 - e^{-kn/m})^k$$

This formula enables computation of the optimal number k of hash functions to use for minimizing this value when n and m are given:

$$k = \frac{m}{n} \ln 2$$

Using this value, the probability of false positive can be estimated as:

$$p \approx 2^{-k}$$

For example, when using 10 bits per element (n elements represented by n*10 bits or Boolean values), the number of hash function should be chosen close to:

$$k = 10 \ln 2 \approx 6.93$$

Using k=7 hash functions leads to a false-positive rate of:

$$p \approx 2^{-7} \approx 0.008$$

This means that with 10 bits per element, the false-positive error rate is below 1%.

As introduced above, Bloom filters are used by cooperative caching web proxies to share their caching content. The publication "*Cache digests*" (A. Rousskov and D. Wessels, *Computer Networks and ISDN Systems* 30, no. 22-23 (1998), pp. 2155-2168) gives an overview of this sharing of caching content.

Each caching web proxy creates a cache digest, i.e. hash values resulting from hash functions, which represents the content of its cache memories using a Bloom filter.

The caching web proxies share their cache digest with the other cooperative caching web proxies.

On receiving a request for a resource not in its cache memories, a caching web proxy uses the cache digest of the other caching web proxies to check whether any of them has that requested resource in its cache memories. If so, the request is sent to the caching web proxy caching the requested resource.

In this way, the number of requests between proxies is greatly reduced, saving network bandwidth.

A false positive happens with a probability of p. A false positive means that a caching web proxy sends a request to one of the other caching web proxies for a resource that the latter does not store in its cache memories.

Even if false positives consume bandwidth, the overall result is still a large decrease of bandwidth usage.

Publication U.S. Pat. No. 7,937,428 discloses a system and a method for generating and using a dynamic Bloom filter. In detail, several cascaded Bloom filters are used to represent a set of elements, wherein each time a new element is added in the set, it is also added to a current Bloom filter of the several Bloom filters. As a Bloom filter false-positive error rate grows with the number of elements it represent, a Bloom filter is considered full when the number of elements it represents reaches a predefined limit, which corresponds to its error rate reaching a corresponding limit. When the current Bloom filter is full, an additional Bloom filter is created and becomes the current Bloom filter for new elements to add to the set. Given that several Bloom filters then coexist, any request for an element involves checking the current Bloom filter and the previous Bloom filters.

The inventors wished to apply the above Bloom-filter-based sharing of cache information to the "Push" model of communication, in particular to the SPDY protocol.

On the Web, the usual paradigm is the "Pull" model whereby a client device, such as a web browser, requests a main digital resource, such as an HTML web page, from a web server device and receives the requested main resource in response.

The client device then parses the received HTML web page to discover which secondary resources referenced therein (e.g. images, scripts, etc.) are required for fully rendering the web page. It then requests them from the server device and upon receiving the requested secondary resources, it displays the entire web page.

However, new technologies, such as SPDY (standing for "SPeeDY") improving the well-known HTTP protocol (standing for "Hypertext Transfer Protocol") for sending web pages over the Internet, have emerged which also provide the above-mentioned "Push" model.

SPDY makes it possible for the server device to push resources to the client device, on its own initiative, over the same network connection as initiated by the original client request. This makes it possible for the server device to push the secondary resources referenced in the main resource requested by the client device, before the latter discovers they are needed for the rendering of the main resource.

Thanks to the SPDY push of resources, web pages can be loaded faster and their rendering be obtained faster.

Sharing cache information of the requesting client device is also an issue to avoid bandwidth waste, by enabling the server device to reduce the resources to push: the server will only push resources not yet in the client cache memories.

It is therefore wished to provide information about the client device's cache memories, using for example a Bloom-filter-based representation, to the server device.

For example, when requesting a main resource from a given web server device, the client device can search its cache memories for all the resources already received, in particular those received from that given web server.

The client device then creates a Bloom filter for representing those resources and sends the created Bloom filter array within the request to the web server device.

From the received Bloom filter array, the web server device is then aware of which resources are already available in the client device and which ones need to be sent to it, with a degree of certainty limited by the probability of false positive.

In the above example of a main requested resource and secondary resources referenced therein, the server device can determine which secondary resources are not yet available in the client device using the Bloom filter array and decide to send those not yet available resources to the client device.

To give an exhaustive explanation, a false positive means that the server device will not push a resource (such as a secondary resource) the client device does not have in its cache memories.

This transposition of the Bloom-filter-based sharing of cache information to SPDY to optimize push of secondary resources raises difficulties.

First, the cache memories of the client device may be quite large and may store thousands of digital resources.

In this context, providing an efficient Bloom filter (i.e. with an acceptable false positive rate) to the server device for these thousands of resources would make the message including such Bloom filter too large for network capacities. Unacceptable delay could therefore be introduced.

This is all the more prejudicial since such cache information could advantageously be inserted in an existing message, such as a request for a main resource, to reduce overhead.

Also, these resources may differently impact the rendering of main resources on which they depend. The supplying of cache information to the server device should therefore be conducted with the view of providing an efficient push of secondary resources from the server device to the client device, so as to improve the client responsiveness. That is the apparent responsiveness through a quick first rendering of a requested main resource and some of its secondary resources, and the true responsiveness through an exact full rendering once the main resource and all its secondary resources are fully loaded.

The present invention has been devised to address at least one of the foregoing concerns, in particular to notify efficiently a remote communication device with cache information of a local communication device, so as to ensure acceptable rendering of a main resource by the local communication device where the rendering indirectly depends on the cache information. This is for example the case with the push of secondary resources as introduced above.

The present invention may apply to the Push model of SPDY but also to any case where cache information representing the availability of resources in cache is generated.

SUMMARY OF THE INVENTION

In this context, according to a first aspect of the invention, there is provided a method of notifying a remote communication device with the availability of resources in cache memories of a local communication device, the method comprising:

obtaining a first list of resources available in the cache memories of the local communication device;

filtering the first list according to at least one filtering criterion relating to a resource parameter, to obtain a filtered list of fewer resources available in the local communication device;

notifying the remote communication device with at least one data structure representing the filtered list of resources.

According to a second aspect of the invention, there is provided a method of notifying a remote communication device with the availability of resources in cache memories of a local communication device, the method comprising:

obtaining a first list of resources available in the cache memories of the local communication device;

splitting the first list according to at least one splitting criterion relating to a resource parameter, to obtain a plurality of sub-lists of resources available in the local communication device;

notifying, preferably sequentially but not necessarily (e.g. in parallel), the remote communication device with data structures, each representing a respective sub-list of resources.

The invention makes it possible for the local communication device, let consider a client device, to quickly notify the remote communication device, let consider a server device, with a restricted list of cached resources selected based on relevant criteria. Therefore, the server device is able to process very early resources that it stores and that are required by the client device, based on the received cache information, through the data structure or structures. As explained below, such data structures may be Bloom filters as described above.

The improvement of the invention is achieved by filtering or splitting the list of resources in cache according to corresponding criteria to obtain a restricted list of most relevant resources. Sending the filtered list or a split sub-list of first importance as early as possible thus provides the server device with the list of the most important resources. The server device is thus able to process early stored important resources to be supplied to the client device.

The filtering step to obtain a filtered list of fewer resources aims at decreasing the number of cached resources to transmit to the server device, since some (sometimes a large proportion) may for example be of no concern for the server device.

For its part, the splitting step aims at providing a first list of cached resources (a first sub-list) quickly to the server device and then at enabling refinement of that list using other sub-lists of less importance that can be transmitted later on.

Of course, selected criteria may impact the efficiency of the invention. Examples of criteria are given below.

Correspondingly, according to a third aspect of the invention, there is provided a communication device in a client-server system, the communication device comprising:

cache memories storing resources;

a resource collector for obtaining a first list of resources available in the cache memories;

a resource filter for filtering the first list according to at least one filtering criterion relating to a resource parameter, to obtain a filtered list of fewer resources available in the local communication device;

a notifying module for notifying a remote communication device of the client-server system with at least one data structure representing the filtered list of resources.

According to a fourth aspect of the invention, there is provided a communication device in a client-server system, the communication device comprising:

cache memories storing resources;

a resource collector for obtaining a first list of resources available in the cache memories;

a resource splitter for splitting the first list according to at least one splitting criterion relating to a resource parameter, to obtain a plurality of sub-lists of resources available in the local communication device;

a notifying module for sequentially notifying a remote communication device of the client-server system with data structures, each representing a respective sub-list of resources.

Referring now to the server device's perspective, a fifth aspect of the invention relates to a method of serving digital resources in a client-server communication system, comprising, at a server device:

a) sequentially receiving, from a communication device, a plurality of data structures representing the availability of respective lists of resources in cache memories of the communication device;

b) receiving, from the communication device, a request for a main resource;

c) determining secondary resources associated with the requested main resource;

d) processing (preferably in a sequential manner) the sorted secondary resources and the received data structures to determine the secondary resources available and those not available in the communication device;

e) serving the main resource in response to the received request and pushing at least one secondary resource determined as not available to the communication device.

The determined secondary resources may be sorted according to at least one sorting criterion so as to simplify the determination of the secondary resources available, for the server device.

Correspondingly, according to a sixth aspect of the invention, there is provided a server device for serving digital resources to a client device in a client-server communication system, the server device comprising:

a communication module for sequentially receiving, from a client device, a plurality of data structures representing the availability of respective lists of resources in cache memories of the communication device; and for receiving, from the client device, a request for a main resource;

a secondary resource module for determining secondary resources associated with the requested main resource;

an availability check module for processing the sorted secondary resources and the received data structures to determine the secondary resources available and those not available in the client device;

a serving and pushing module for serving the main resource in response to the received request and for pushing at least one secondary resource determined as not available to the client device.

The server device of the invention can thus efficiently process the received data structures produced by the splitting mechanism introduced above at the client device. Distinction between the secondary resources to be pushed required for rendering a requested main resource and those already cached by the client device is thus early determined.

The server device thus also contributes to ensure acceptable rendering of a main resource by the client device where the rendering indirectly depends on the cache information.

Other features of embodiments of the invention are further defined in the dependent appended claims. While these features are mostly described with reference to methods of the invention, similar features are provided for corresponding client and server devices.

The above-defined methods can be implemented using a non-transitory computer-readable medium storing a program which, when executed by a microprocessor or computer system in the communication device, causes the communication device to perform their steps.

According to a first embodiment of the invention as described below, the method of notifying comprises both the filtering and splitting steps, wherein the step of splitting is performed on the filtered list obtained from the step of filtering.

In one embodiment of the invention, the splitting provides an ordered plurality of sub-lists according to the at least one splitting criterion and the data structures are notified (preferably sequentially) according to the order of their respective sub-lists in the ordered plurality. This is to ensure the provision of the server device first with the list of the most important cached resources given the client device and the criteria used. The server device is thus able to first process the most important resources that are required for the client device, so as to ensure the best rendering of a requested main resource at the client device.

In particular, a splitting criterion for ordering the plurality of sub-lists is based on a resource type parameter of the resources. In a context of web pages, a resource type parameter may for example distinguish style sheet resources from javascript resources, also from image resources, from video resources, etc. This is because the type of secondary resources is of first importance when rendering a main resource referencing those secondary resources. Indeed, the style sheet resources heavily impact the rendering of the main resource and thus are generally first processed by a web rendering engine to display a correctly structured page. On the contrary, the content resources (images) may be processed later on since empty content slots in the displayed page are generally accepted by the user for a while.

According to another embodiment of the invention, the at least one filtering or splitting criterion is chosen from the group made of:
  the device of origin of the resource, in other words, the server device that originally supplied the client device with that resource. This makes it possible for example to select only the cached resources that were supplied by the same server device, in case a new request is made for that server device;
  cache validity information associated with the resource in the cache memories. This makes it possible to discard or give less importance to resources that are liable to be out-of-date. This is because cache validity is known as defining a theoretical lifespan of the associated resource;
  a size of the resource;
  a type of the resource;
  information relating to a link between the resource and a primary resource requested by the local communication device to the remote communication device.

In particular, the filtering criteria comprise the device of origin of the resource, the cache validity information and the information relating to a link between the resource and a primary resource; and the splitting criteria comprise the resource type and size. This configuration provides a good trade-off between which cached resources to be kept and notified to the server device (i.e. filtered) and the ordering of the kept resources regarding their relevancy in a rendering process (i.e. splitting).

A splitting criterion may be closely related to the impact of each resource on the rendering of a requested main resource, wherein the resources are secondary resources referenced within one or more main resources requested by the client device, including the appearance of the rendering or the functionalities during the rendering as perceived by a user.

According to another embodiment of the invention, the or each data structure notified to the remote communication device comprises a Bloom filter to represent the resources of the corresponding filtered list or sub-list. This is to minimize the data to be transmitted to the server device.

Based on the Bloom filter approach, one may note that, the data structure is a set of Boolean values, each resource of the filtered list or sub-list is converted into a plurality of hash values using hash functions and the hash values are mapped onto the data structure by setting to 'true' the Boolean value of index equal to each hash value. Only one bit (Boolean value) is required to store the information about a hash value. Therefore the data structure is of small size.

In that case, at the server device, determining whether a resource is available in the local communication (client) device is done by using the data structure, wherein the resource is determined as available only if all the Boolean values indexed by hash values obtained from the resource are 'true'. Efficient availability checking is thus obtained.

According to a particular feature, the first subpart of the data structure is a Bloom filter and the additional subpart extends the Bloom filter for the resources of the additional group only. Bloom filters prove to be well adapted to availability checking as discussed above.

According to yet another embodiment of the invention, the data structure (resulting from the first list) first notified is included in a request for a main resource from the local communication device, acting as a client device, to the remote communication device, acting as a server device.

In the above mentioned example of the secondary resources, this provision makes it possible for the server device to be aware of a first list of cached resources (generally the most relevant ones) as soon as it receives the request for a main resource. The server device will thus efficiently detect which related important secondary resources need to be pushed since they are missing at the client device (i.e. not yet cached).

In particular, any subsequent data structure to notify the resources available at the local communication device is included in a subsequent request for obtaining a secondary resource from the remote communication device, wherein the secondary resource is referenced by the main resource received in response to the request for the main resource. This provision operates in the case where the first list is split into several sub-lists, each sub-list being sequentially notified through the request for the main resource and the subsequent requests for missing secondary resources.

According to a particular feature, the method further comprises obtaining a size of a request for the main source; obtaining a maximum request size function of a communication network between the local communication device and the remote communication device; determining a size available to transmit a first one of the data structures by difference between the obtained request size and the maximum request size; wherein the splitting into sub-lists is also function of the determined available size.

This provision optimizes the use of the request to notify the server device with the cached resources, while not impacting the efficiency of transmission of such request on the communication network.

Of course, this approach may be iteratively performed for each subsequent request as it is decided to include therein a sub-list. The sub-lists are thus formed iteratively, for example from an original sorted list in which splitting locations are iteratively determined.

In particular, the first list to split is first sorted according to the at least one splitting criterion and then split according to the determined available size. Thus, consistent sub-lists are formed, possibly in an iterative process, in particular where the splitting criterion makes it possible to sort the first list with the most important or relevant caches resources being placed at the top of the list.

According to an exemplary embodiment, the first list to split is first sorted according to a resource type parameter and then to a resource size parameter of the resources; and the sorted first list is then split according to the determined available size, to the resource type parameter, and further to the resource size parameter if a splitting based only on the determined available size and the resource type parameter does not reach at least one threshold value regarding the number of resources in a first sub-list obtained. Of course, in a variant, the resource size parameter can be discarded from the process, thus resulting in only using the resource type parameter to form the sub-lists.

This provision is based on parameters that reveal to be efficient in discriminating between important cached resources for rendering a main resource and less important cached resources for the same rendering.

As described below, the use of the resource size parameter may optimise the filing of the request.

Still in the exemplary embodiment, any of the data structures may be included in a request together with splitting information, the splitting information comprising values of the resource type parameter and of the resource size parameter, if any, defining the data structure. Of course, in a more general approach, splitting information included in the request intend to define the criteria used for providing the splitting of the first list into sub-lists. Based on this information, the server device can check more efficiently the availability of each secondary resource by using the corresponding Bloom filter. This information can also be used in a process for updating the Bloom filters in the server device, as further explained below.

According to yet another embodiment of the invention, the method further comprises determining, in the first list, a primary resource and secondary resources that are linked to the primary resource in the meaning that the rendering of the primary resource requires the secondary resources; and substituting, in the first list, the primary resource and the secondary resources with a virtual resource defining the primary and secondary resources; wherein the data structure represents the availability of the virtual resource and not of each of the primary and secondary resources separately.

This combination of resources makes it possible to reduce the size of the data structure or, if keeping its size, to include other cached resources. As described below, care should be taken when using the virtual resource to avoid useless pushes of resources.

Regarding the server device's perspective, various embodiments can be implemented as described below.

In particular, the steps b) to e) may be iterated as the server device receives a plurality of requests for main resources; the method further comprising generating, at the server device, an additional data structure representing the list of the secondary resources pushed at step e) of an iteration, wherein the generated additional data structure is added to the set of received data structures for step d) of a next iteration.

This updating of the set of data structures makes it possible for the server device to get a better knowledge of the resources cached by the client device, in case another request is received from the same client device.

According to a particular embodiment, for any new data structure representing the availability of resources in cache memories of the requesting communication device that is received during step d) or e), the availability of the secondary resources determined as not available in step d) and not yet pushed are checked again based on the newly received data structure. This is to avoid push of secondary resources that are actually cached by the requesting client device.

According to another embodiment, a first one of the data structures is received in the request for the main resource. According to another embodiment, the data structures are Bloom filters.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device or the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

Figure 1:
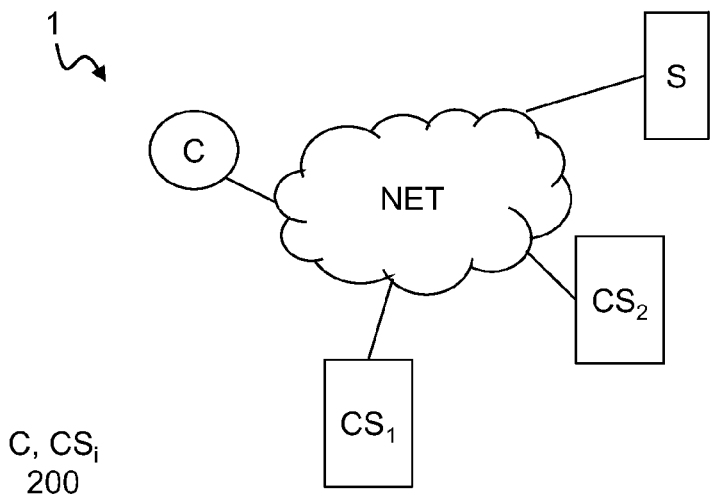
FIG. 1 illustrates a typical web client-server communication system in which embodiments of the invention may be implemented.

The invention provides methods, systems and devices for notifying a remote communication device with the availability of resources in cache memories of a local communication device. As described below, such notification can be made using Bloom filters.

In the above examples, the remote communication device may act as a server device of a client-server communication system, while the local communication device may act as a client device. Below, reference will be mainly done to a server device and to a client device, rather than to the local and remote communication devices.

From a first list listing resources available in the cache memories of the local communication device, the invention provides filtering the first list according to at least one filtering criterion relating to a resource parameter, to obtain a filtered list of fewer resources available in the local communication device. In a variant, the invention provides splitting the first list according to at least one splitting criterion relating to a resource parameter, to obtain a plurality of sub-lists of resources available in the local communication device.

Data structures are thus obtained that represent the obtained filtered list or the obtained sub-lists.

The obtained data structures, for example Bloom filters, are then transmitted to the remote communication device, in a sequential manner when a plurality of data structures is generated. Parallel transmission of some data structures may also be performed.

The filtering or sorting criteria make it possible to implement policies where the server device (remote communication device) is early informed of the caching, by the client device, of important or relevant resources. This enables the server device to efficiently and quickly decide between pushing or not some of the important resources needed by the client device.

On one hand, important or relevant resources can be seen as resources that the client device considers as of interest in its relationship with the server device.

As explained below, this is mainly used when filtering the cached resources, in order to notify the server device only with information about cached resources that are of interest.

On the other hand, important or relevant resources can be seen as resources the impact of which on the rendering of a main resource requested by the client device is quite high, including the appearance of the rendering or the functionalities during the rendering as perceived by a user.

As explained below, this is mainly used when splitting the cached resources, in order to first notify the server device with information about cached resources that have a big impact on the rendering of a requested main resource, while information about cached resources that have less impact can be notified later on.

This is because the server device can thus first process the important secondary resources (needed for rendering the requested main resource) since it knows which one are already cached by the client device.

Therefore, the important secondary resources missing at the client device (not cached therein) are pushed early in the process.

Combination of filtering and splitting thus offer an optimal notification of the server device with information about relevant caches resources.

The invention also provides methods and server devices for serving digital resources in a client-server communication system.

A typical web client-server communication system 1 is shown in FIG. 1, in which embodiments of the invention may be implemented.

It comprises a communication network NET such as an IP-based local or wide area network (LAN, WAN), a web server device S that offers IP-based services, such as web sites, caching web server devices CSi and a client device C.

Each server devices S,CSi hosts digital resources in internal storage memories and can provide them to any requesting party.

In the typical system 1, the client device C implements a web browser through which a user interacts to generate and send HTTP requests to the web server device S in order to request main resources, e.g. web pages.

Similarly, the web server device S may request any of the caching web server devices CSi for a resource that it does not host but has to serve to the client device C.

To optimise the exchange of messages between on the one hand C and S and on the other hand S and CSi, the devices can share cache information represented by Bloom filters as briefly introduced above.

The present invention more specifically regards how the cache information shared by the client device C is generated by it and used by the server device S. In particular, it regards how some cached resources are considered with higher priority given some criteria so as to early notify the server device S with important cached resources.

The description below will make reference to a SPDY-based example, where the server device receives a request for a main resource from the client device; determines whether a secondary resource referenced within the main resource (e.g. an image in a requested web page) is available in the client device using the data structure or structures (Bloom filter) received from the client device; and pushes the secondary resource to the client device in case of negative determination.

Other situations may be implemented within the scope of the invention, for example when the server device S requests a caching server device CSi for a resource that S does not host yet but has to serve to C. To link that case to the preceding example, the server device S receives a request for a main resource from a client device C; determines whether a secondary resource referenced within the main resource (e.g. an image in a requested web page) is available in the caching server device CSi using the data structure or structures (Bloom filter) received from the caching server device; requests the secondary resource from the caching server device CSi in case of positive determination; and pushes the secondary resource obtained from the caching server device to the requesting client device C. The server device S could also proceed in a similar way to retrieve the requested main resources from the caching server device.

Figure 2:
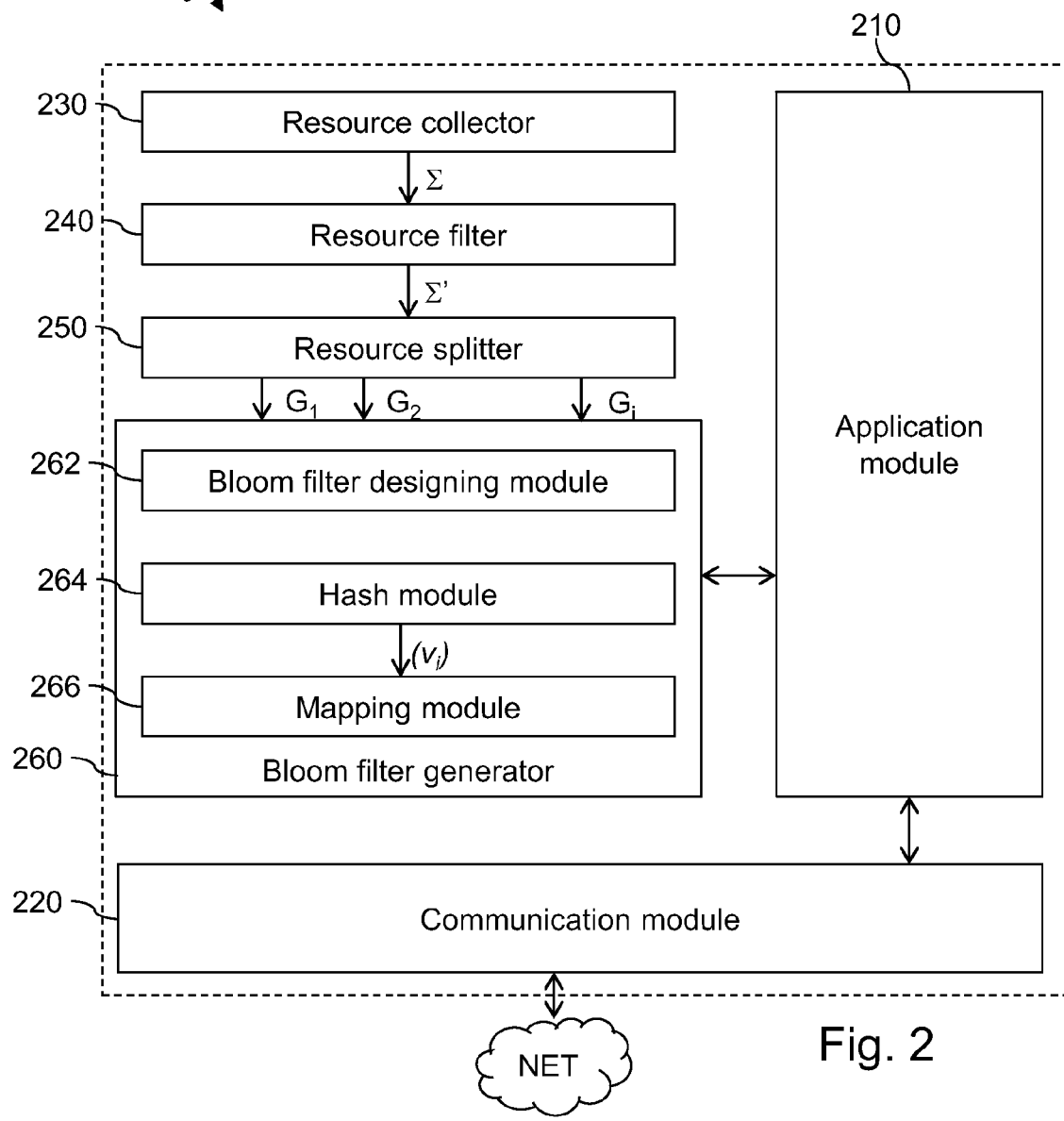
FIG. 2 is a block diagram illustrating functional components of the client device or a caching server device of FIG. 1 in which embodiments of the invention may be implemented.
Figure 3:
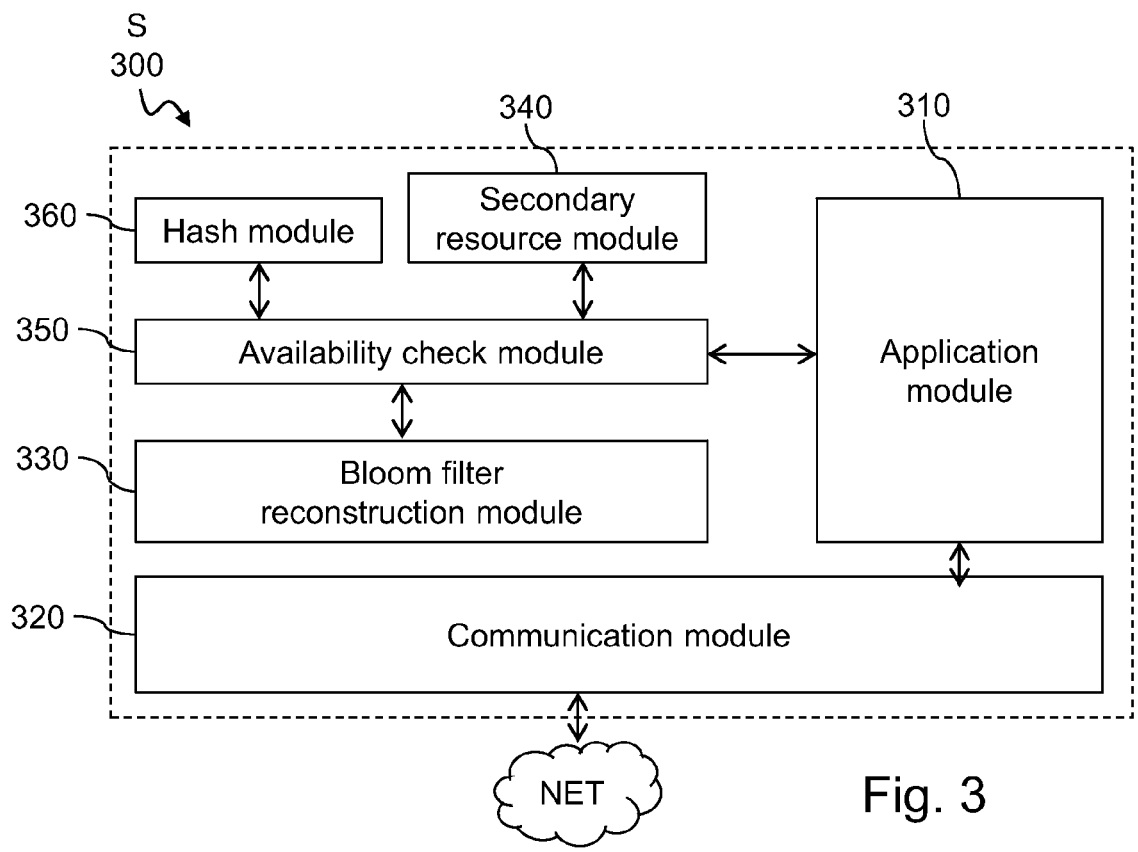
FIG. 3 is a block diagram illustrating functional components of the server device of FIG. 1 in which embodiments of the invention may be implemented.

FIGS. 2 and 3 show functional blocks of the devices of the client-server communication system 1.

FIG. 2 shows functional blocks of a client device C or a caching server device CS depending on which one is concerned by the provision of data structure information corresponding to cache information to the server device S. FIG. 3 shows functional blocks of the server device S.

The communication device 200 of FIG. 2 comprises an application module 210 designed to handle requests and responses with S, for example according to the SPDY protocol, and a communication module 220 interfaced with the network NET to send or receive the requests/responses to/from S.

Implementation of the invention provides the communication device 200 with a resource collector 230 to obtain a first list $\Sigma$ of resources available in the cache memories of the communication device; a resource filter 240 to filter the obtained first list according to at least one filtering criterion relating to a resource parameter, to obtain a filtered list $\Sigma'$ of fewer resources locally available in the communication device. Examples of criteria are provided below. The filtering operation thus reduces the number of resources in the first list. This is described below with reference to FIG. 6.

The communication device 200 also comprises a resource splitter 250 to split the restricted list Σ' of relevant resources according to at least one splitting criterion relating to a resource parameter, to obtain a plurality of sub-lists $G_i$ of resources locally available in the communication device. Examples of criteria are provided below. The resource splitter 250 may provide an ordered plurality of sub-lists according to the at least one splitting criterion, meaning for example that a first sub-list contains the most important cached resources given the criterion or criteria used, and that subsequent sub-lists contain gradually less important cached resources.

While the present example implements both a resource filter 240 and a resource splitter 250, other embodiments of the invention may implement only one of these two modules to produce either a restricted list Σ or a plurality of sub-lists Σ', that are then feed to the next module 260. For the remainder of the description, preference is given to the example including both the resource filter 240 and the resource splitter 250.

The communication device 200 comprises a Bloom filter generator 260, i.e. a generator of data structures representing lists or sub-lists of cached resources.

The Bloom filter generator 260 receives as input the sub-lists $G_i$ of cached resources and other parameters described below, and generates a Bloom filter for each received list or sub-list.

The Bloom filter generator 260 comprises a Bloom filter designing module 262, a hash module 264 and a mapping module 266.

The Bloom filter designing module 262 is configured to determine the characteristics of the Bloom filter given the number of bits per element, the number of caches resources in a given list or sub-list and a target false positive rate p. This may for example determine the length m of the binary array and the number k of hash functions to be used.

The hash module 264 is designed to provide one or more hash functions for each of the list or sub-list $G_i$ of cached resources, and for calculating one or more hash values $v_i$ for each cached resource of a list or sub-list using the one or more corresponding hash functions. The number k of hash functions and the size m are determined by module 262.

Predefined hash functions may be known from the communication device 200 and the server device S from these numbers.

To reduce complexity of this module when the communication device 200 is configured to generate a large number of hash values $v_i$, the one or more hash functions may be different combinations of the same base hash functions (at least two), for example of two base hash functions.

For example, each of the k hash functions used by the Bloom filter is computed as a linear combination of these two base hash functions. If the two base functions are $h_1(x)$ and $h_2(x)$, then the i-th hash function $g_i$ for the Bloom filter may be defined as:

$$g_i(x) = h_1(x) + ih_2(x)$$

Using such a definition for the hash functions does not change the characteristics of the Bloom filter and has no impact on the Bloom filter performance.

The mapping module 266 receives as input the hash values $v_i$ calculated by the hash module 264 and is configured for mapping each obtained hash value onto one Boolean value of the m-bit Bloom array.

Once the mapping module 266 has mapped all the hash values onto the Bloom array, the Bloom filter has been generated.

The same operations are performed for the other list or sub-lists, thus generating several Bloom filters, possibly in the same order as the order of the plurality of sub-lists.

The obtained augmented Bloom filter is then sent to the application module 210 for processing, in particular for sending to the server device S as described below.

In particular, the Bloom filters for the sub-lists are (sequentially and/or in parallel) notified according to the order of their respective sub-lists in the ordered plurality.

The server device 300 of FIG. 3 comprises, similarly to FIG. 2, an application module 310 designed to handle requests and responses with the communication device 200, for example according to the SDPY protocol, and a communication module 320 interfaced with the network NET to send or receive the requests/responses to/from C or $CS_i$.

In particular, the communication module 320 of the server device S sequentially receives, from the client device C, a plurality of data structures representing the availability of respective lists of resources in cache memories of the client device.

It (320) also receives, from the client device C, requests for main resources, as well as subsequent requests for secondary resources missing at the client device C.

Implementation of embodiments of the invention provides the server device 300 with a Bloom filter reconstruction module 330, a secondary resource module 340, an availability check module 350 and a hash module 360 similar to module 264.

The Bloom filter reconstruction module 330 is configured to parse data from bitstreams received from C or $CS_i$ to retrieve sent Bloom arrays as well as other parameters defining the Bloom filter.

Such parameters, some of which may be optional, are described below and may comprise splitting information used by module 250 to generate the sub-lists and thus the several Bloom filters. For example, the splitting information may comprise values of the resource type parameter and of the resource size parameter, if any, defining the data structure.

The augmented Bloom filter reconstruction module 330 thus reconstructs the Bloom array.

The secondary resource module 340 is configured to determine secondary resources associated with a requested main resource; and to sort the determined secondary resources according to at least one sorting criterion. For example, this sorting criterion may be derived from (or be the same as) the splitting information associated with the Bloom filters provided in the bit streams. This is because, the server device may thus process the secondary resources in the same priority order as used by the client device to first handle the most important secondary resources for which it may have received the corresponding Bloom filter.

The availability check module 350 is configured to process (preferably in a sequential manner) the sorted secondary resources and the received data structures in a given priority order (receiving order or order defined by the sorting/splitting criteria) to determine the secondary resources available and those not available in the client device C 200.

To perform such a check, module 350 is able to use the hash module 360 to obtain the hash values corresponding to each sorted secondary resource in order to determine the availability of that resource thanks to a Bloom filter-based verification (all corresponding Boolean values set to 'true' or not).

The check result from the availability check module 350 is sent to the application module 310, based on which the latter may decide whether to take action or not to push the given secondary resource to the communication device 200 (client device) or to request the given resource from the communication device 200 (caching server device $CS_i$).

The communication module 320 thus includes a serving and pushing module (not shown) for serving any requested main resource in response to a received request and for pushing the secondary resources determined as not available to the client device.

Figure 4:
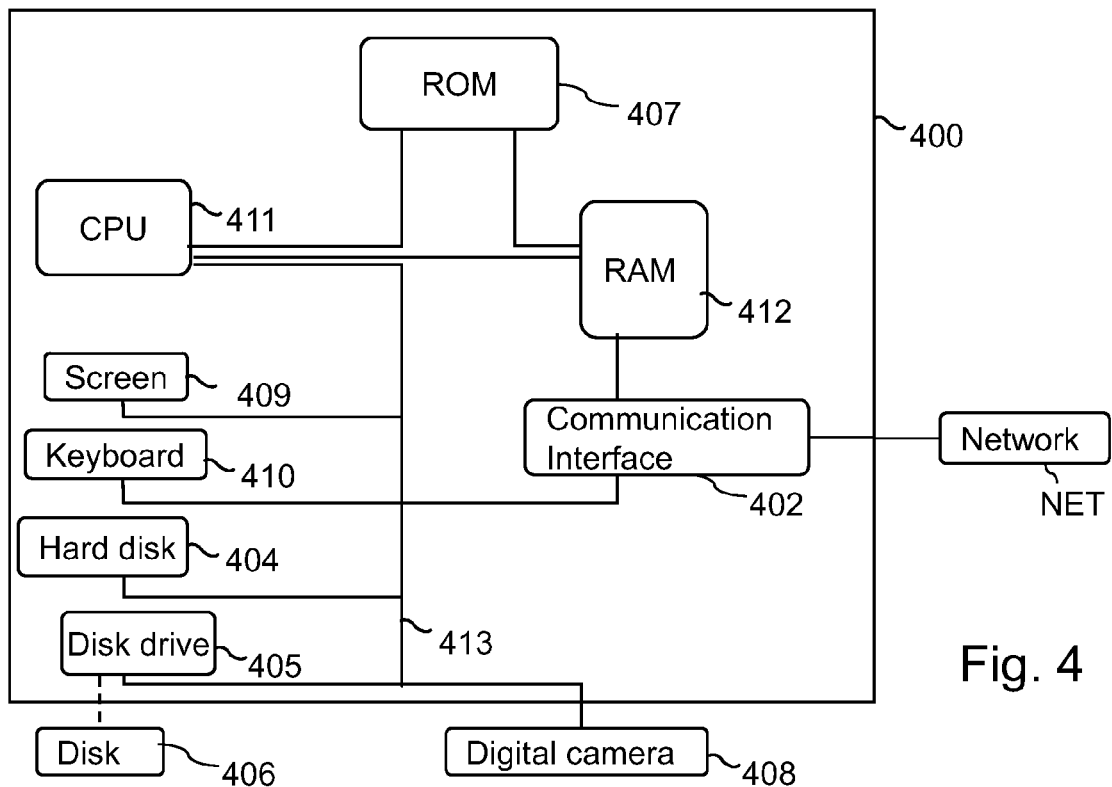
FIG. 4 is a block diagram illustrating components of a communication device in which embodiments of the invention may be implemented.

FIG. 4 schematically illustrates a communication device 400, either the client device C or caching server device CS of FIG. 2, or the server device S of FIG. 3, or a device embedding both functionalities, configured to implement at least one embodiment of the present invention. The communication device 400 may be a device such as a micro-computer, a workstation or a light portable device. The communication device 400 comprises a communication bus 413 to which there are preferably connected:
- a central processing unit 411, such as a microprocessor, denoted CPU;
- a read only memory 407, denoted ROM, for storing computer programs for implementing the invention;
- a random access memory 412, denoted RAM, for storing the executable code of methods according to embodiments of the invention as well as the registers adapted to record variables and parameters necessary for implementing methods according to embodiments of the invention; and
- a communication interface 402 connected to the communication network NET over which a client-server based communication can be implemented. The communication interface is provided to send requests or responses, such as HTTP requests/responses including digital resources, possibly in the Push or Pull model of communication, as well as to receive the requests or responses.

Optionally, the communication device 400 may also include the following components:
- a data storage means 404 such as a hard disk, for storing computer programs for implementing methods of one or more embodiments of the invention and for storing digital resources that can be requested by a client device, during the implementation of one or more embodiments of the invention, and for implementing a cache memory when required;
- a disk drive 405 for a disk 406, the disk drive being adapted to read data from the disk 406 or to write data onto said disk;
- a screen 409 for displaying data such as a web page in the case of the client device and/or serving as a graphical interface with a user, by means of a keyboard 410 or any other pointing means.

The communication device 400 can be connected to various peripherals, such as for example a digital camera 408, each being connected to an input/output card (not shown) so as to supply data to the communication device 400.

The communication bus provides communication and interoperability between the various elements included in the communication device 400 or connected to it. The representation of the bus is not limiting and in particular the central processing unit is operable to communicate instructions to any element of the communication device 400 directly or by means of another element of the communication device 400.

The disk 406 can be replaced by any information medium such as for example a compact disk (CD-ROM), rewritable or not, a ZIP disk or a memory card and, in general terms, by an information storage means that can be read by a microcomputer or by a microprocessor, integrated or not into the communication device, possibly removable, and adapted to store one or more programs whose execution enables a method according to the invention to be implemented.

The executable code may be stored either in read only memory 407, on the hard disk 404 or on a removable digital medium such as for example a disk 406 as described previously. According to a variant, the executable code of the programs can be received by means of the communication network NET, via the interface 402, in order to be stored in one of the storage means of the communication device 400, such as the hard disk 404, before being executed.

The central processing unit 411 is adapted to control and direct the execution of the instructions or portions of software code of the program or programs according to the invention, which instructions are stored in one of the aforementioned storage means. On powering up, the program or programs that are stored in a non-volatile memory, for example on the hard disk 404 or in the read only memory 407, are transferred into the random access memory 412, which then contains the executable code of the program or programs, as well as registers for storing the variables and parameters necessary for implementing the invention.

The execution of the program or programs instantiates software modules implementing specific functions, for example the modules as described above with reference to FIGS. 2 and 3.

In this embodiment, the device is a programmable apparatus which uses software to implement the invention. However, alternatively, the present invention may be implemented in hardware (for example, in the form of an Application Specific Integrated Circuit or ASIC).

The above-mentioned SPDY-based example implementing embodiments of the invention is now described with reference to FIGS. 5 to 10. In this example, it is made reference to a single server device and a single client device. The same approach may be used in the case of competing connections involving other client/server devices.

Figure 5:
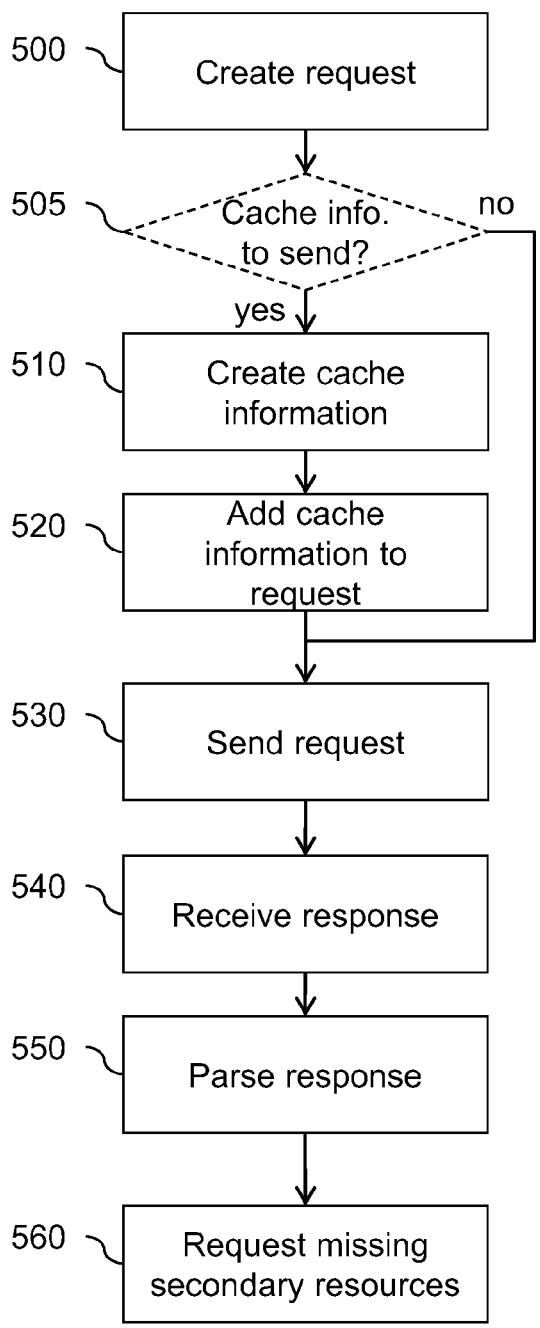
FIG. 5 is a flowchart illustrating general steps for a client device to request a main digital resource from a server device according to embodiments of the invention.

FIG. 5 is a flowchart illustrating general steps for a client device (e.g. a web browser) to request a main digital resource from a server device according to embodiments of the invention.

The invention as described in this application is adapted to HTTP GET requests, but can apply to other types of request with slight adaptations. For example, HTTP POST requests may be targeted with minimal changes: the size of the request body must be taken into account while computing the available size for the cache information as described below.

At step 500, the client device C creates a new request for obtaining a main resource or a web page from the server device S.

At step 510, the client device C creates its own cache information, for example a representation of its cache memories using one or several Bloom filters according to the invention. This step is described in details below with reference to FIG. 6.

Following step 510, step 520 consists for the client device C to add first cache information to the request.

The sent cache information has to be exhaustive enough to make it possible for the server device S to reconstruct the same Bloom filter and to be able to conduct the availability check.

The sent cache information, also referred above as "data structure information", is made of the mapping data structure itself, i.e. a Bloom array as explained above, and of additional information or characteristics describing the Bloom filter. The cache information is encoded and stored in the header of the request, for example in an HTTP header that is safely handled by SPDY. Due to the fact that HTTP does not allow binary values in headers, cache information provided in HTTP headers are encoded using for example base64 encoding.

Step 520 is followed by step 530 where the client device C sends the request including a first Bloom filter to the server device S.

Below is described how to keep a request with a satisfactory size to avoid large delay in its transmission to the server device. This is taken into account when splitting the filtered list into sub-lists so that the first sub-list to transmit satisfies request size criteria.

At step 540, the client device receives the requested main digital resource.

At step 550, it parses the received main resource in order to render it. In the example, it is a web page to be displayed on a screen display.

At step 560, the client device C requests the server device S for any secondary resource referenced in the main resource, that is missing, i.e. that the client device does not yet hold in its cache memories and that is not being pushed by the server device S.

In this situation, any subsequent data structure to notify the resources available at the client device may be included in a subsequent request for obtaining a secondary resource from the server device, wherein the secondary resource is referenced by the main resource received in response to the request for the main resource. This is particularly suitable for SPDY where in the same current network connection, S and C can exchange a plurality of messages.

In parallel to steps 550 and 560, the client device C receives secondary resources pushed by the server device on its own initiative, thus reducing the number of requests to be sent at step 560.

Various approaches may be implemented by the client device C to determine when requesting the missing secondary resources, in particular because there may be delay between receiving the requested main resource and some pushed secondary resources.

A first approach is for the client device to wait for some time after sending the main request and having received the response. Then, it asks for each missing secondary resource not in its cache and not yet pushed by the server. This first approach is used in most cases at least partially: before starting requesting secondary resources, the client device needs to parse the response to determine which secondary resources are necessary for rendering the main resource.

Alternatively, the client device may wait until the server device is no more starting to push any new resource.

For a more responsive behavior, the client device can also check which kinds of resources are currently pushed by the server device when the splitting or filtering of the invention is based on such criterion. This is because, assuming that the client device knows the priority order of the server device (at least) roughly, once the server device has finished pushing some kind of resources, the client device can start asking for any missing resource of that kind.

For the example where CSS resources are processed with a higher priority than JavaScript resources as suggested below, when the server device starts pushing JavaScript resources, the client device can assume that all CSS resources have been pushed. Then the client device may start requesting any missing CSS secondary resources.

In a variant, the server device can send a manifest indicating all the resources it is going to push before it actually pushes them.

In this situation, the client device can start asking for missing secondary resources that are not listed in the received manifest, as soon as this manifest is received. The manifest can be sent in several pieces to match the possible split of the cache description sent by the client device.

With a protocol that can multiplex pushed resources, such as SPDY, such a manifest can be implemented without any cost using the resource headers. The server device thus first push only the resource headers, notifying in this way all the content it is going to push. Then, it goes on by pushing the resource contents. These resource contents can be organized according to some priority.

In addition, if the server device is not sending all the resources at once, but splitting them (either because it has not yet received all the client's cache information, or for sending most priority resources first), the server device can include a specific header in the headers of the last resource of a group. This specific header describes the kind of resources sent in the group in a manner similar to the cache information as explained below.

As shown by the dotted line of step 505 in FIG. 5, an optional step 505 can be provided prior to creating cache information. This optional step may consist in determining whether or not to include the cache information in the request message based on one or more criteria. This is because in some cases it is not worth including cache information, for example because the server device already has it.

To illustrate some situations, if the client device C has a persistent connection with the server device S and has already sent to it cache information, sending new cache information may not be necessary. The decision in that situation may be based on history information specifying that cache information has already been sent to the server device. However, this should take into account any request received from the server device to receive the cache information or an updated version of it.

In another situation, if the request is for a main resource that does not reference any secondary resources therein (e.g. images, scripts, etc.), the cache information may prove not to be necessary for the server device S.

This is for example the case for a request targeting some up-to-date data in the JSON format (e.g. for up-to-date stock quotes, or for recent tweets). Such a request generally returns one resource without any link to other secondary resources.

In this situation, it is then not necessary to include the cache information in the request.

The decision whether or not to include the cache information in the request may be based on the above-mentioned history information; and/or the expected type of the result (for example a JSON document, or an image because it usually does not contain any other secondary resource); and/or the source of the request. For a URL given by the user (directly or through a bookmark), the cache information should probably be included. For a URL extracted from a received resource, or for a request generated by some JavaScript code, the client device C has already made some requests to the server device and therefore it is not necessary to include cache information; and/or statistics on the URL of the request.

Figure 6:
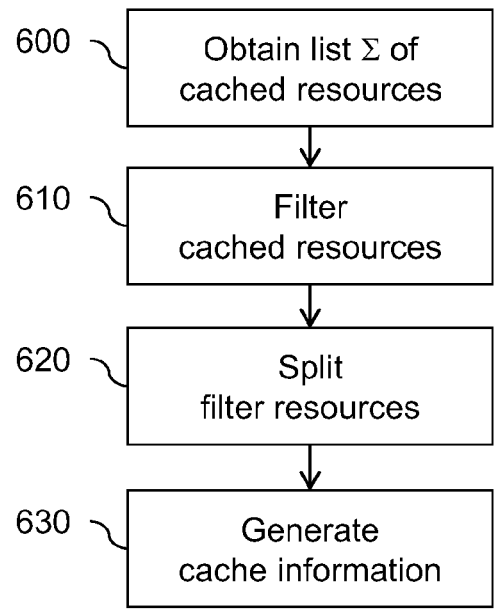
FIG. 6 is a flowchart illustrating steps for the client device to create cache information during the process of FIG. 5.

FIG. 6 is a flowchart illustrating steps for the client device C to create cache information, i.e. to create Bloom filters during above step 510.

The cache information creation process starts at step 600 by obtaining a list $\Sigma$ of resources stored in cache memories of the client device C.

This may be done by getting all the resources present in the client caches, as well as the metadata associated with them (e.g. a URL, a validity date . . . ).

Next, step 610 consists in filtering the resources into a filtered list Σ' to keep only relevant resources that the client device considers as of interest in its relationship with the server device to be requested.

The filtering is based on at least one filtering criterion relating to a resource parameter, i.e. a parameter of the resource as stored in the cache memories (for example in associated metadata). The criterion or criteria may be selected from the group made of:
- the device of origin of the resource;
- cache validity information associated with the resource in the cache memories;
- the size of the resource to discard some resources. For example, small resources are first discarded since the cost for sending them again is generally the lowest;
- the type of the resource;
- information relating to a link between the resource and a primary resource liable to be requested by the client device to the server device.

Preferably, the filtering criteria comprise the device of origin of the resource as a first criterion. The cache validity information may be an additional criterion implemented together with the first criterion. And the information relating to a link between the resource and a primary resource may be another additional criterion implemented together with the previous two criteria.

The criterion of origin server device for the cached resource means that only cached resources previously served by the server device to which the new request (as prepared at step 500) is targeted are kept. This may be done by checking the URL in the metadata associated with each resource of the list Σ. This is to reduce as much as possible the amount of cache information to be transmitted to the server device, i.e. to reduce the number of resources to be represented by the Bloom filters, and thus the size of the Bloom filters.

Particular cases may arise.

For instance, due to performance reasons, some web sites spread their resources among several host names, i.e. several servers. For example YouTube (registered trademark) uses four host names for serving some of its resources: i1.ytimg.com, i2.ytimg.com, i3.ytimg.com, and i4.ytimg.com. This practice is known as server sharding.

Ideally, a given resource should always be served from the same host name to take advantage of the client cache. However, if this is not the case, the different host names used in server sharding should be considered as only one server.

In that case, the filtering is adapted so that a list of sets of host names that should be grouped as one server is predefined. When the request prepared at step 500 targets a host name which is in a set of the list, all the cached resources corresponding to any one of the host name in the same set should be kept when filtering based on the host name.

The criterion of cache validity may use a cache validity item of information stored in the metadata associated with each resource of the list Σ.

A straightforward approach is to remove all the resources whose associated expected cache validity has expired, because they are liable to be out-of-date.

But, in most cases, the true validity of a resource is longer than its published expected cache validity. This is to prevent a client device from continuing using a resource that has been changed on the server.

As a consequence, more lax validity criteria can be implemented.

For example, the expected cache validity could be extended either by a predefined duration, or expanded by a predefined factor. Resources without any cache validity (i.e. that should not be cached) can be nonetheless cached with predefined expected cache validity duration.

Instead of using only one predefined factor, several predefined factors can be used. For resources that are critical for a correct behavior of a web page (e.g.: a JavaScript resource), the expected cache validity may be set to a very short duration, well under the real validity duration of the resource. For fewer critical resources (e.g.: an image), the expected cache validity may be set to a longer duration, much closer to the real validity duration of the resource. To take into account these differences, the predefined factor can be larger for short expected cache validity durations than for longer ones.

In addition, statistics about each resource can be obtained to more precisely determine its true validity.

For example, the cache validity associated with a resource may be updated based on a time between two successive downloads of different versions of that resource and optionally on (an uncertainty measure defined by) a time between a last version check followed by a subsequent download and this subsequent download.

To be more precise for each resource, the last time it was downloaded, and the last time it was checked for validity can be saved in memory.

Then, when a resource is downloaded once again because it has changed, the time between the two downloads becomes its true validity, and the time between the last check and the new download is the uncertainty of this measure.

The expected validity of the new version of the resource can be set to this true validity modified by the uncertainty. For conservative results, the uncertainty or a fraction of it is subtracted from the true validity. For a more optimistic usage of the cache, the uncertainty can be discarded and the true validity can be multiplied by a predefined factor.

In addition, the starting date for the true validity can either be the last check or the new download, or somewhere in between.

This strategy can be slightly enhanced by storing in memory a few values of the true validity as it changes with time, and setting the expected validity as an average or weighted average of these stored true validities.

This strategy can also help determine which resources published as non-cacheable are really transient and which ones can nevertheless be kept in the cache.

These management and update of the cache validity are performed by the client device itself.

In a variant, the server device may provide the client device with cache validity information and validity updating information, simultaneously to the transmission of the corresponding resource.

While the server device already defines an expected validity (or minimum cache validity) for a resource that it is sending to the client device, it may also define maximum cache validity.

The expected validity or "minimum cache validity" is the time during which the client device can use the cached version of the resource concerned without checking its validity with the server device. That means that the resource as cached is already in use.

The maximum cache validity is the time after which the resource concerned will have most probably been updated, and thus the client device should either discard it from its cache or check with the server device.

The filtering operation may be based on any of these two cache validity values to keep some resources or not.

In addition, for the client device to keep an accurate validity for the resources in its cache memories, the server device may send validity updates to the client device, from time to time.

For example, during a period where the connection between the server device and the client device is idle (for example after transmitting all the secondary resources relating to a requested web page to the client), the server device can push the response to one or more virtual HEAD requests relating to resources already cached by the client device. Such a message includes only the headers associated with a response that would transmit the resource to the client device. This is because such headers include versioning and cache validity information, based on which the client device can update the cache validity information of corresponding resources in its cache memories.

The server device may decide to send such HEAD responses only for the resources for which the validity information was not sent recently.

The various cache validities may be used by the client device as a basis for cache validity criterion: published expected cache validity, true validity, validity received from the server device, etc.

The criterion of the information relating to a link between the resource and other resources is now explained. For example, some resources are specific to a given web page or type of web page, and therefore corresponding cache information need not to be transmitted to the server device when the client device requests another web page.

Except the resources directly requested by the client device (usually the main HTML document of a web page), each other resource (in particular the secondary resources) is linked from another resource. These links can help determine whether a resource is specific to a web page or used by several web pages.

When storing resources in the cache memories of the client device C, the links between the resources can be preserved in an accessible format. This organizes all the resources in a tree whose roots are the resources directly requested by the client device.

Based on this tree, the number of incoming links can be computed for each resource. The filtering may be based on this number: if the number of links for a resource is sufficiently small, this resource and all the resources descending only from it in the tree are discarded.

The decision as to whether a number of links is sufficiently small can be based on the absolute number of links coming directly or indirectly from a root resource: for example if a resource has only one incoming link from a root resource, it is probably specific to the web page corresponding to this root resource and can be safely discarded from the list $\Sigma$.

Another possibility is to use the relative number of direct incoming links depending on the number of root resources for the web site.

More sophisticated techniques can also be used by grouping root resources according to the path of their URL. This can help discover a family of web pages sharing a common set of resources. This then provides the possibility of keeping only these resources in the list $\Sigma$ (i.e. in the cache information sent) when requesting an unknown web page belonging to this family.

In addition, resources descending from the main resource for which a request is made are not discarded, whatever their number of links.

This first approach is mostly based on statistics on the number of incoming links resulting from previous requests.

However, in some cases a more formal distinction between several parts of a web site could be made to discriminate between URI (and thus resources) that are independently used and to determine which resources are common to several URIs. This may be implemented in cooperation with the statistical first approach.

For example, when using Google Office Suite (registered trademark), the URI for a spreadsheet starts with "https://docs.google.com/spreadsheet/", while the URI for a textual document starts with "https://docs.google.com/document/".

When using one of these applications, it is relevant to include in the client cache information only the resources corresponding to the application used, but not the resources corresponding only to the other application.

Information enabling such approach could be provided by the server device, for example by listing a set of root URIs and by stating whether the URIs are application specific or common to several applications. For example, using the previous example, a Google (registered trademark) server could publish the following listing:

https://docs.google.com/document/ specific
https://docs.google.com/spreadsheet/ specific
https://docs.google.com/images/ common This tells that the two first root URIs are specific to their respective applications. Therefore, a cached resource with a URI starting with one of these root URIs should be kept only if the requested main web page (as prepared at step 500) has a URI starting with the same root URI.

On the other hand, the third root URI is common to all applications. Therefore, a cached resource with a URI starting with this root URI should be kept whatever the requested web page is.

It is to be noted that in the case where this link criteria is used to filter some resources, when requesting another web page from the same server device, it may be necessary to send another cache information (Bloom filter) of the cache resources that can be linked to this new web page but were not sent in the cache information for the previous request. In other words, the process according to the invention should be repeated using, for a new request, a different value for the link criteria at the filtering step 610.

Still referring to FIG. 6, step 610 is followed by step 620 consisting in splitting the filtered list $\Sigma'$ into two or more groups of cached resources or "sub-lists", for example to classify the secondary resources according to a level of importance regarding the impact when rendering a main resource requested by the client device. The impact on rendering may include the appearance of the rendering or the functionalities during the rendering as perceived by a user.

The splitting is based on at least one splitting criterion relating to a resource parameter. The criterion or criteria may be selected from the group made of:
the device of origin of the resource;
cache validity information associated with the resource in the cache memories;
the size of the resource;
the type of the resource;
information relating to a link between the resource and a primary resource liable to be requested by the client device to the server device.

Preferably, the filtering criteria comprise the resource type and, optionally, the resource size.

The resource type criterion is now explained. The type of a resource may reflect the nature or genre of the content of the resource, for example an image, a video, a HTML page, a CSS style sheet, a JavaScript, etc.

Different resources play different roles in the rendering of a web page. In addition, while downloading and rendering a web page, a web browser handles resources according to their types for providing a correct behavior.

For example, a web browser usually does not start rendering a web page before all the style sheet (CSS resources) components for it have been downloaded. This is to prevent the web browser from rendering the same part of a web page several times.

Once all the CSS resources for the web page to render have been downloaded, the web browser starts rendering the web page, even if some other components are missing (for example, scripts, images, etc.).

This example shows that priority should be given to the CSS resources in the case of a requested web page, so that the rendering is started as soon as possible.

For a JavaScript resource, the behavior is different. The web browser will not render any component defined, in the web page to render, after the location where the JavaScript resource is included. This is because the JavaScript may change parts of the main web page after this location.

In addition, the web browser may not start downloading anything else while downloading a JavaScript resource. This is to be certain that the JavaScript resources are executed in the correct order, i.e. the order in which they are defined within the web page.

This shows that a high priority should be given to the JavaScript resources, but that this priority can be lower than the one for CSS resources.

Images and videos have a lower impact on the rendering process of a web page including them. While not loaded, they will not be displayed, but, except an empty area, they will not impact otherwise the rendering of the web page.

This shows that an even lower priority could be given to the image and video resources in the case of a requested web page.

Among the images and videos, those having the most impact on rendering the web page are images used for the layout of the page (background images, images for buttons or menu items, start of list items . . . ). Some of those may even prevent the web page from being correctly perceived by the user, but they are not frequent. To illustrate this situation, let consider a web page having a dark background image with text in white. While waiting for the dark background to be received and loaded, a default white background may be displayed, thus preventing the white text from being visible to the user.

From these explanations, it may be understood that by considering the types of the resources, an ordered plurality of sub-lists of cached resources may be generated, where the first sub-list starts with CSS resources and the last sub-list ends with video resources.

This resource type criterion may be used for the filtering operation as suggested above. In the example above, it may be chosen to filter the first list Σ to keep for example only CSS and JavaScript resources that have the most important impact on early rendering of a web page.

In particular cases where the JavaScript is defined in the top of a web page, JavaScript and CSS resources have a similar impact on rendering the web page. Therefore, they can be considered with the same level of priority. JavaScript may even be considered with higher priority than CSS resources.

The resource size criterion is now explained when used for any or both of the splitting operation and the filtering operation.

The size of the resources may be used to keep or to give priority to large resources that take more time to be transmitted. In this way, the server device is able to decide early after receiving the cache information (Bloom filters) whether a large resource is to be pushed or not.

On the other hand, for small resources to which low priority is given, corresponding Bloom filters describing them can be received later on. In that situation, the server device is liable to have decided to push the small resources although they are already cached by the client device. But since they are small resources (rather than large resources), the impact on network communication is reduced.

In the particular case of the filtering operation using a size threshold, the server device knows the size threshold used (it is shared by the client and server before the request, or it is transmitted by the client device together with the Bloom filter), and thus does not push any small resource but lets the client device to request them. This is because small resources are transmitted quickly over the network.

In a variant, the server device can push the small resources, which means that the client device may receive again resources already present in its cache.

The usage of resource size as a filtering or splitting criterion should take into account the properties of the network between the client device and the server device for being more efficient. Two properties can be used to characterize a network connection, and thus the size threshold or thresholds: its latency and its bandwidth.

For purposes of illustration, a higher network bandwidth decreases the difference of transfer time between small and large resources. In the same way, higher network latency also decreases the difference of transfer time between small and large resources.

Therefore, for a network with a low latency, filtering out the small resources is acceptable, as the cost of the request for retrieving them from the server device will be quite low in term of time.

However, for a network with higher latency, the small resources should be kept, and possibly split into a sub-list having less priority in the cache information.

Back to FIG. 6, after the resource filtering and splitting of steps 610 and 620, the ordered sub-lists $G_i$ of relevant resources have been obtained.

Next, at step 630, a Bloom filter is successively generated for each sub-list given the order of the sub-lists, based on the number of resources comprised therein and on the number of bits per element, using appropriate hash functions.

Based on the linear combination of two base hash functions as defined above, the two values $h_1(x)$ and $h_2(x)$ for each resource may be computed on the concatenation of the resource's URI and its content. These values are then stored in the cache memories, among the metadata stored for the corresponding resource for future use (e.g. when determining again Bloom filters for a new request for a main resource). This reduces the computing costs associated with the generation of Bloom filters.

The obtained Bloom filters are then transmitted to the application module 210 to include for example the first one (according to the above order, i.e. the Bloom filter representing the sub-list having the highest priority) in the request to be sent (above step 530). This may be done by adding a specific request header to the request, containing the Bloom filter, and possibly some information about the splitting criteria. This header is referred to below as the "cache content header".

The application module 210 manages the other Bloom filters representing the other sub-lists to include them in subsequent messages to the server device. They can be specific messages if the protocol used allows them, or be subsequent requests for obtaining secondary resources.

Figure 7:
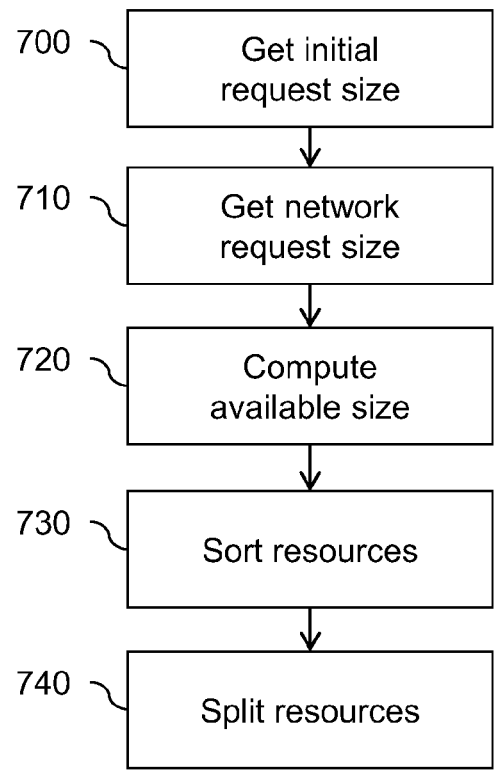
FIG. 7 is a flowchart illustrating steps for the client device to split the resources during the process of FIG. 6.

FIG. 7 is a flowchart illustrating steps for the client device to split the first list Σ into sub-lists, i.e. to perform step 620.

The process starts at step 700 where the client device gets the initial request size. This size corresponds to the size of the request (step 500) which would be sent without the invention, i.e. without any Bloom filter therein.

At step 710, the client device obtains the maximum request size for being sent quickly through the network. The preferred value for this maximum request size is the current available size from the TCP congestion window (cwnd) of the communication network NET between the client device and the server device In most cases, this would be the cwnd itself. But if the TCP connection is shared with other requests, this value may be smaller than the cwnd.

In addition, if the cwnd is large, using it fully as the maximum request size may not be a good strategy to determine the size of the Bloom filter that can be included in the request. This is because as many IP datagrams (or TCP segments) would be sent, the probability that one of them does not reach its destination (the server device) may become too high. Therefore, a limit of a few TCP segment size may be used to define the maximum request size.

At step 720, a size available to transmit a first one of the data structures is determined by difference between the obtained request size and the maximum request size; wherein the splitting into sub-lists is also function of the determined available size. As explained below, this determined available size is used for transmitting the Bloom filter representing the first sub-list, i.e. the sub-list having the highest priority. That means that conversely the first sub-list is constructed based on this determined available size.

The basis for this computation is to subtract the initial request size to the maximum request size. This gives the maximum size for the cache content header for the first sub-list.

To find the maximum size for the Bloom filter itself, the size of the cache content header name, and the size of the description of the splitting criteria (i.e. splitting information) should be subtracted from the obtained available size.

One may note that the size of the description of the splitting criteria cannot be known exactly in advance, but it can be evaluated easily to get a maximum size for it.

Some protocols, like SPDY, compress the request headers. Therefore, all the computations could be realized taking into account the compression.

However, as Bloom Filters tend to be filled by an array of random bits, they are mostly non-compressible. Therefore, it is a good approximation to consider the uncompressed size of the Bloom filter to be the same as its compressed size or close to it. This reduces the computational costs. As suggested above, HTTP headers can be encoded using base64 encoding. In this situation, a 4/3 factor may be used to compensate the cost of this base64 encoding.

If compression should be taken into account, it is possible to obtain a good approximation of the compressed size of the initial request by compressing it. However, adding another header to it may slightly change the results, and compressing the initial request would cost some computing resources.

Therefore, if considering the compression effect, computing an approximate maximum compressed size would be enough.

This may be done by first computing the approximate compressed size of the initial request, using the following formula:

$$S = S_0 + \sum_{h \in headers} (S_{name} + \text{size}(h \cdot \text{value}))$$

where $S_0$ is a constant representative of the compression overhead, $S_{name}$ is a constant corresponding to the size of the header name, and size(h.value) is the size, in bytes, of the header value.

$S_{name}$ is a constant because it is expected that all header names are well known, and therefore are compressed efficiently with a constant size.

size(h.value) could be tailored for some specific headers to take into account specific kinds of values that are better compressed than others.

The compressed size of the name of the cache content header can likewise be evaluated to $S_{name}$.

The size of description of the splitting criteria can be expected to be small, and therefore its compressed size can be approximated with its uncompressed size evaluation.

All these values give the possible compressed size for the Bloom Filter itself.

Using the "Compressed Bloom Filters" of Michael Mitzenmacher (2001, PODC'01), i.e. an extension to Bloom filters, the compressed and uncompressed sizes of a Bloom Filter are different. In such a case, a compression factor to be experimentally determined can be used to compute the uncompressed size from the evaluated compressed size.

These explanations show that step 720 provides a size available for representing the Bloom array.

A typical available size is now given as an example.

The expected MSS (standing for Maximum Segment Size) value for an Internet connection is 1,460 bytes (1,500 bytes for a Maximum Transmission Unit of an IP datagram, less 40 bytes for the IP and TCP headers in case of IPv4).

The size of HTTP headers for a minimal HTTP request made by a browser is around 400 bytes. This size is generally increased by either long URIs or Cookies.

Therefore, the size of an HTTP header for a standard HTTP request may thus be considered between 500 and 800 bytes.

Using these estimates, the available size for a Bloom filter is between 660 and 960 bytes, allowing from 44 to 64 resources to be represented in the Bloom filter with 15 bits allocated per resource. This would allow an error rate of about 0.1%, which is quite satisfactory.

At step 730, the cached resources of the filtered list Σ' are sorted according to one or more criteria, in particular according to the splitting criteria as defined above for step 620. The first resources in the sorted list are those having the highest priority (for example large CSS resources), while the last one are those having the lowest priority (for example small video resources).

At step 740, the sorted resources are thus split into one or more groups or sub-lists.

The available size obtained at step 720 is used to determine the first splitting location, i.e. the position in the sorted list where the resources located before the position form the first sub-list, and the resources located after form the other sub-lists (with less priority).

The first splitting location is selected in such a way that the first sub-list of cached resources can be represented by a Bloom Filter whose size is less than the available size obtained at step 620. That means that the number of resources in this first sub-list times the number of bits per resource is less than this obtained available size.

Two approaches for determining the first splitting location are provided here below. Of course, more complex approaches can be implemented using the details below.

In a first approach, the first splitting location is chosen using a single criterion which is the resulting Bloom Filter size. That means that the available size, as compute at step 620 is divided by the number of bits per resource and rounded down to the nearest integer. The result is the number of resources to be kept in the first group.

This approach reveals to be simple from the point of view of the client device. Furthermore, upon reception of the Bloom Filter (which thus corresponds only to the first sub-list $G_1$), the server device will not know which kind of resources are present in the Bloom Filter. Therefore, when checking the availability of a resource in the client cache using that Bloom Filter (as previously described), it will not know whether a negative result means that the resource is not available in the client cache or is not represented by that Bloom Filter.

Consequently, splitting information is transmitted to the server device together with the Bloom filter, as suggested above. The splitting information provides enough information to the server device for it to be able to know which resources are concerned by the received Bloom filter, for example through the criteria used for sorting the resources and thus for sequentially processing the resources, and to know the bounds of the transmitted Bloom filter regarding these criteria.

Examples of the splitting information are given below with reference to FIG. 8.

A second approach for determining the first splitting location consists in first selecting a splitting location as described for the first approach and then refining the obtained splitting location using the sorting criteria. This aims at finding a splitting location that corresponds to a significant change in the value of at least one of the criteria.

An example of this second approach and of the refinement of the splitting location is given below with reference to FIG. 8.

This refinement is generally realized by starting from the obtained splitting location and going backward until a significant change of value is detected. The change in the value of one or more criteria can be described in the cache content header as a splitting item of information. This enables the server to know which kinds of resources are represented by the Bloom Filter.

At the end of step 740, a Bloom Filter has been created to represent the first sub-list $G_1$ of cached resources.

As explained above with reference to step 520, this first Bloom Filter may be added to the request using a cache content header. Information about the splitting location, if any, is also included in this cache content header.

For purposes of illustration, the cache content header may have the following representation:
Cache-Representation: number-resources, Bloom-filter-array, [splitting-info]
where number-resources specifies the number of resources represented by the Bloom filter, Bloom-filter-array represents the binary array of the Bloom filter, and splitting-info are the optional splitting information as explained above.

For example, for a Bloom filter representing 26 resources without splitting information, the cache content header is:
Cache-Representation: 26,67e32ca . . .

This cache content header provides the information needed by the server device to correctly use the Bloom filter. Indeed, the server device needs the following items of information: the number of resources in the Bloom filter (transmitted in the header); the Bloom filter array of Boolean values (transmitted in the header); the size of the Bloom filter array (computed from the received array); the number of bits per element (computed from the size of the Bloom filter and the number of resources); the number of hash functions (computed using the formula optimizing the error rate); the hash functions (generally predefined); and the splitting information (transmitted in the header).

In a variant, the number of bits per resource may be transmitted instead of the number of resources.

The same algorithm can be used to process the remaining resources in the sorted list, although step 730 can be skipped since the cached resources are already sorted (if the sorting criteria remain unchanged). In that case, a next opportunity to send cache information to the server device is waited for (it can be either a message allowed by the communication protocol used, or a subsequent request for a secondary resource as explained above, or any other type of message). When such opportunity occurs, the client device determines the available size for representing a new Bloom filter in this new opportunity, size from which a new splitting location can be obtained as explained above.

This algorithm may be slightly adapted by playing on the number of bits per resource if needed.

As exposed above, the number of bits per resource is deduced from a target error rate.

In a particular situation where the number of resources multiplied by the number of bits per resource is less than the available size for the Bloom Filter (as obtained at step 720), the number of bits per resource can be increased to fit as much as possible the available size. This improves the false positive rate.

In another situation where the available size for the Bloom Filter is relatively small (i.e. a limited number of resources can be represented), it may be worth increasing the number of resources represented by the Bloom Filter, as the effective error rate may be greater than the theoretical one.

First, if the available size only allows the Bloom Filter to contain a very small number of resources, the number of bits per resource can be increased, further decreasing the number of resources included in the Bloom Filter, but allowing keeping a correct effective error rate. This is because, for a small number of elements, the effective error rate of a Bloom Filter can be higher than the theoretical error rate. Indeed, the theoretical error rate is obtained through mathematical approximations that do not hold for a small number of elements in the Bloom Filter.

It may also be decided to not include the first Bloom filter directly in the request, but to send it afterwards in a subsequent message.

In one particular approach, the Bloom filter parameters can be included in the request, while the Bloom filter array is sent only in the subsequent message. In this way, as soon as the server device receives the request, it knows that it can expect cache information in subsequent messages and wait for them before starting to push secondary resources to the client device.

It may also be decided to increase the request size up to the size of 2 cwnd, and thus the available size. This will make the request slower, but will enable to include more cache information therein.

For example, a request size of 2 cwnd−1 could be used. With this request size, if one of the TCP segments sent for the first part of the request is slow to reach the server device (or if its acknowledgement is slow to come back), this will have less impact on the reception of the whole request.

In parallel, it may happen that the client device detects a too large rate of false positives when requesting web pages from the server device. In this situation, the client device may decide to increase the number of bits allocated per resource and to notify the same server device either only for future connection or for the current and future connections in which case the client device may start sending an update of the cache information to the server device based on the new number of bits per resource. Details on the updating of the server device are given below.

Figure 8:
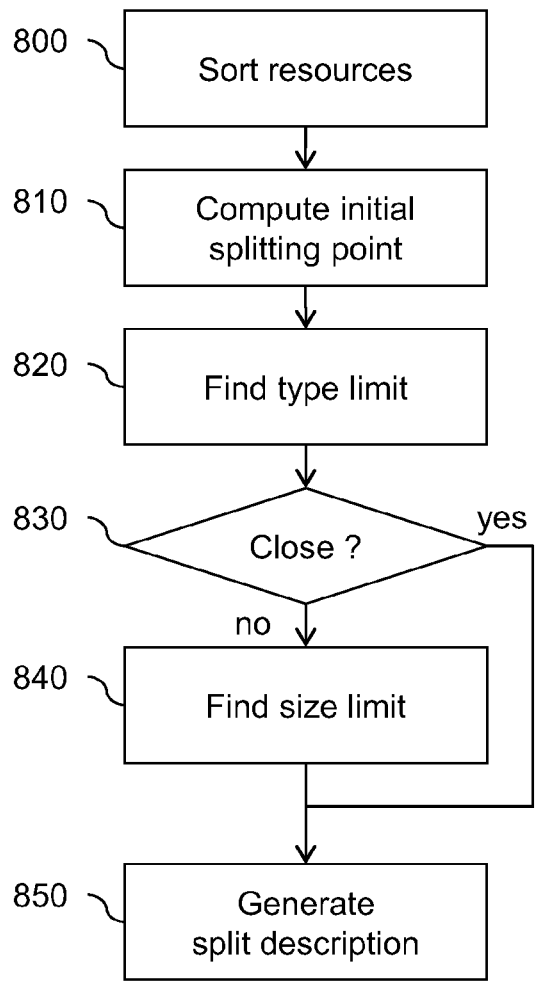
FIG. 8 is a flowchart illustrating more detailed steps for the client device to split the resources during the process of FIG. 7.

FIG. 8 illustrates an example of steps 730 and 740 using specific splitting criteria.

At step 800, the cached resources of the filtered list Σ' are sorted according to two criteria: first, by resource type as defined above, second by resource size as also defined above.

The goal of this step is to group all the resources by type, and then for each type sort them by decreasing size order.

In an embodiment not based on the size criteria, the splitting step results in groups of unsorted resources having the same resource type.

The resource type criterion sorts resources depending on their type, using the following order: CSS documents, JavaScript, image and videos. The resource size criterion sorts resources by decreasing size.

At step 810, the initial splitting point is computed, using the available size obtained at step 720 for the Bloom Filter and the number of bits per resource to allocate.

At step 820, from this initial splitting point, a limit between the resource types is looked for, going towards the start of the sorted list. The limit is thus the first change in resource types when scanning the sorted list from the initial splitting point towards the start of the list.

If the obtained limit is sufficiently close to the initial splitting point (test at step 830), then the limit is used as the first splitting point and the process goes on at step 850.

Otherwise, a better limit is search for at step 840.

Test 830 is performed by comparing the initial splitting point with the found limit. This comparison can be done using the number of resources delimited by the splitting point (referred to as the initial number of resources), and the number of resources delimited by the found limit (referred to as the reduced number of resources).

A first comparison method is to test whether the reduced number of resources is at least 90% of the initial number of resources, or not.

In a variant, a second comparison method is to test whether the reduced number of resources is at least the initial number of resources decreased by 10, or not.

A combination of these comparison methods or using different values is also suitable for test 830.

In any case, if the reduced number of resources is null or too close to zero (too far from the initial number), the algorithm goes on at step 840 where a better limit is seek based on the resource size criterion.

Starting again from the initial splitting point, going backward towards the top of the sorted list, the resource sizes are tested until finding a first resource of the same resource type as the initial splitting point, the size of which (first resource) is above a given threshold value.

For example, such threshold value could be the first power of ten encountered.

The new limit is then set between two successive resources having the same resource type, where the first resource size is above that first power of ten, while the second resource size is below that same power of ten. For instance, if the initial splitting point is located at a resource having a size equal to 7,500 bytes, the new splitting point is located at the first next resource having the same resource type and a size equal to or above 10,000 bytes (since the sorting is based on decreasing size).

If a new limit based on resource size cannot be found, the limit based on resource type is selected.

Other sets of threshold values could be used, using for example more values for the small sizes.

Once the final splitting is chosen, it delimits the first sub-list or group of resources whose description has to be sent to the server device.

The group description is generated at step 850 as part of the splitting information. This group description enables the server device to find which kinds of resources are represented by the corresponding Bloom Filter.

Some examples of the group description are now given.

If the limit used is based on the resource type, then all the types of resources found in the group are listed. For example, if the resources are only CSS and JavaScript resources, then the group description can be:

css, js

If the limit used is also based on the resource size, then all the types of resources found in the group are listed, and for the last resource type, the limit size is given. For example, if the resources are CSS resources whose size is greater than or equal to 10,000 bytes, the group description can be:

css, 1e4

Using another example, where the resources are both CSS and JavaScript resources, with JavaScript resources having a size greater than or equal to 2,000 bytes, with a more precise size description, the group description can be:

css, js, 2e3

At the end of step 850, all the information for generating the cache content header (i.e. Bloom filter, splitting information) is available.

It should be noted that for a further splitting of the sorted resources to generate the other sub-lists of lower importance, the description of the new sub-list of resources does not need to describe the size threshold for the beginning point of the sub-list. This is because the beginning point can be retrieved from the previous descriptions (Bloom filters) received by the server device, according to the sorting criteria shared between the client and the server (for example induced from the receiving order of the requests).

In the last example, a next sub-list of resources containing only JavaScript resources having a size smaller than 2,000 bytes, and greater or equal to 500 bytes, the group description could be only:

js, 5e2

Figure 9:
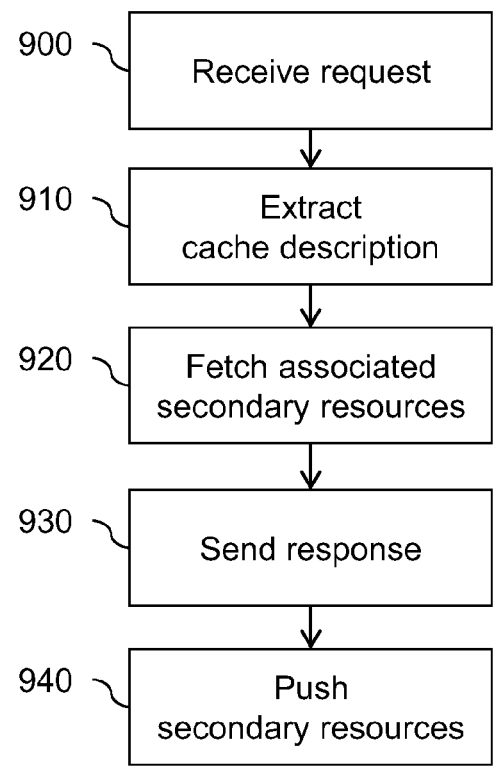
FIG. 9 is a flowchart illustrating general steps for the server device to use the Bloom filter or filters provided by the client device through the process of FIG. 5.

With reference to FIG. 9, the use of the Bloom filters by the server device C is now described. In the above SPDY-based example, the Bloom filters are provided from the client device C, within a request for a main resource and subsequent messages or requests. As already mentioned, another approach is to consider a caching server device CS that supplies the server device S with its cache information so that S can request CS for any resource S needs.

At step 900, the server device S receives a request for a main resource, said request including for example a Bloom filter.

At step 910, the server device S extracts Bloom filter information from the cache content header and request information from the request and reconstructs the Bloom filter.

The reconstructed Bloom filter is added to the list of Bloom filters for the client device.

Based on the request information, the server device S obtains, at step 920, a list made of the requested main resource and of all the secondary resources associated with the main resource (e.g. secondary resources referenced within the main resource). These secondary resources are needed by C to correctly render the main resource and can be determined based on a predefined list of resources associated with each (main) resource.

The main resource is sent automatically to C (step 930) without checking that it is available in C. Otherwise, in case of false positive, the client device could not obtain the missing resource.

At step 940, the server device pushes, to the client device, the secondary resources determined as not available at the same client device. This step is further described below with reference to FIG. 10, to take into account the several Bloom filters the server device may have received from the client device according to the invention.

One may note that steps 910 to 940 can be performed at least partly in parallel.

Figure 10:
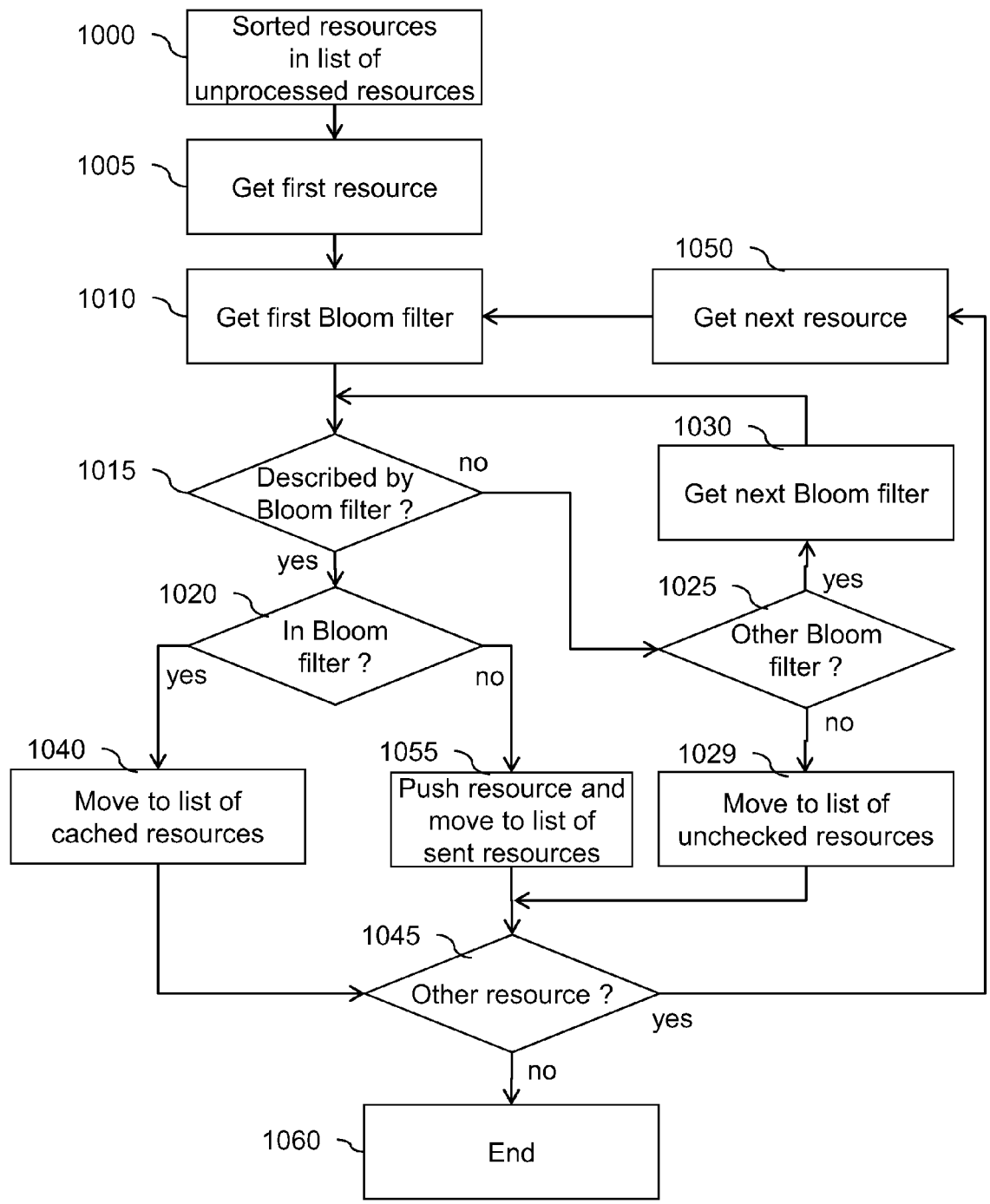
FIG. 10 is a flowchart illustrating steps for the server device to decide to push secondary resources during the process of FIG. 9.

Turning now to FIG. 10, it is described the process for the server device to push secondary resources to the client device.

This process is based on processing sorted secondary resources and received data structures (Bloom filters) in a given priority order (generally the receiving order) to determine the secondary resources available and those not available in the client device, before pushing the secondary resources determined as not available.

To perform this process, the server device uses four lists of resources:
a list of unprocessed resources initially made of the secondary resources as determined at step 920;
a list of unchecked resources, initially empty;
a list of cached resources, initially empty; and
a list of sent resources, initially empty.

At step 1000, the list of unprocessed resources, i.e. of the secondary resources, is sorted according to at least one sorting criterion. The sorting criterion or criteria are similar to the splitting criterion or criteria used by the client device at step 730. The sorting criterion or criteria may be obtained from the splitting information in the received cache content headers.

In a variant, the sorting operation may be roughly done compared to the splitting performed at the client device. For example, the sorting may be done based only on the resource type criterion to sort the resources only among JavaScript, CSS, images, etc. Then the algorithm is applied to each group, starting from the most important group. This removes the necessity of sorting all the resources while keeping an efficient order for pushing them.

Then, each secondary resource of the sorted list is sequentially processed as shown by the loop 1010-1045-1050 described below.

Initially, the first secondary resource of the sorted list of unprocessed resources is obtained at step 1005.

At step 1010, the first Bloom filter of the plurality of Bloom filters already received by the server device is selected from the plurality. This plurality may be restricted to a single Bloom filter if only the request received at step 900 has been processed. Of course, when new Bloom filters are received, they are fed into this plurality, as further explained below.

The plurality of Bloom filters is ordered according to an importance ranking based on the above sorting criterion or criteria (i.e. the splitting criteria used by the client device). This makes it possible to define a first Bloom filter representing the most important resources for the client device and subsequent Bloom filters successively processed through the loop 1015-1025-1030.

From the Bloom filter currently selected, the Bloom filter description is obtained. This description contains for example the splitting information. If the description states that the Bloom filter represents resources corresponding to the currently processed secondary resource (test 1015), the algorithm continues at step 1020.

Otherwise the process selects the next Bloom filter, if any, according to the order of the plurality of Bloom filters. This is step 1025 that checks whether a Bloom filter not yet selected from the plurality exists and step 1030 where the next available Bloom filter is actually selected. If there is no other Bloom filter (output "No" at step 1025), the current secondary resource is moved to the list of unchecked resources at step 1029 before going to step 1045.

A Bloom filter represents resources corresponding to the currently processed secondary resource if the latter is within the limits of the Bloom filter as defined by the splitting criteria (in the splitting information).

For example, given the above example of two successive Bloom filters, the splitting information of which comprises respectively css, js, 2e3 and js, 5e2, a secondary resource having a JavaScript type and a size of 1,300 bytes does not correspond to the first Bloom filter but to the second one.

At step 1020, the currently selected Bloom filter is used to test whether the current secondary resource is already cached by the client device. This is done by conventional Bloom filter mechanisms as explained above.

If the Bloom filter indicates that the resource is in the client cache (output "Yes" at step 1020), then the current secondary resource is moved to the list of cached resources at step 1040, and the algorithm loops back to step 1010 after selecting the next secondary resource at step 1050, if any (test 1045).

Otherwise (output "No" at step 1020), the current secondary resource is pushed to the client device C at step 1055 and it is moved to the list of sent resources. Then, the algorithm loops back to step 1010 after selecting the next secondary resource at step 1050, if any (test 1045).

When all the secondary resources have been processed, the process ends at step 1060.

The list of unprocessed resources is a list of objects representing the secondary resources to be pushed to the client device, as determined at step 920.

At the beginning of its creation, each object contains the URI of its corresponding secondary resource. As the process goes, the object is supplemented with the two base hash values used at step 1020, either by retrieving them from some cache of the server device, or by computing them upon the first pass at step 1020. Any new check at step 1020 is thus made easier.

Furthermore, the objects may also be supplemented with a pointer to the content of their corresponding secondary resource. This makes it possible for the server device to quickly retrieve the content to push to the client device in case of unsuccessful check 1020.

The structure of the list of unchecked resources is similar to the structure of the list of unprocessed resources.

The list of cached resources can be represented in various ways.

For example, it may be made of a list of objects representing the objects supposed (according to the Bloom filters) to be in the client cache. In such a case, this list can be used as a shortcut to check whether a secondary resource is in the client cache (it can be used between step 1005 and 1010).

For reducing the memory use of the server device, this list can also be discarded.

The list of sent resources is the list of all the resources sent to the client. Thus, it includes all the resources pushed at step 1025, and also all the resources sent as a response to a client's request (see step 930).

This list may contain objects in a similar way as the list of unchecked resources.

In a variant reducing the memory use of the server device, it may also be represented as a Bloom Filter, preferentially with a very low error rate.

In any case, this list is added to the list of Bloom filters that are tested in step 1020 through the loop 1025-1030, preferably at its beginning. Indeed, this list is additional knowledge for the server device about the resources the client device stores.

To further reduce the memory used by the server device, there may be a unique representation of all the resources contained in each web page, this representation being shared by all the client devices having requested and received the web page from the server device. This avoids duplicating the same information at the server device. In practice, when transmitting the web page to a client device (either in response to a request or by pushing secondary resources), the server device may use a temporary representation for the web page's resources already transmitted. Only once all the resources of the web page have been transmitted, the common Bloom filter is used in replacement of the temporary one.

As noted above, the server device may receive at any time a new Bloom filter from the client device, for example when receiving a request for a missing secondary resource.

In the situation where it is received while the server device is performing the process of FIG. 10, the process is temporarily frozen. During the freezing, the newly received Bloom filter is appended to the plurality of Bloom filters. Then, all the resources discarded at step 1015 (i.e. in the list of unchecked resources) are checked against this new Bloom filter in a similar fashion as done in steps 1005, 1015, 1020, 1055, 1045 and 1050) to identify whether some discarded resources are in fact available at the client device and to push the resources not yet received by the client device if they correspond to this new Bloom filter.

Then the process resumes from the freezing point to process the remaining unprocessed resources.

Also, the server device may receive at any time a new request from the client device, in particular a new request for a main resource.

In that case, the main resource specified in the request is removed from the list of unprocessed resources or from the list of unchecked resources, if appropriate, and is added to the list of sent resources. Furthermore, all the secondary resources linked to this main resource are checked against the four existing lists to determine whether some of them are already listed, and the non-listed secondary resources are added to the list of unprocessed resources so that they are processed as shown in FIG. 10 or may form another list of unprocessed resources.

If several lists of unprocessed resources are being processed simultaneously using the above algorithm, the selection (step 1050) of a new resource to be processed is adapted. In particular, the next resource to process in each list is obtained and the most important one (given the sorting criteria) is selected from them.

Above step 1029 occurs for each secondary resource that is not described by the received Bloom filters. Such secondary resources are not pushed to the client device in the above algorithm.

However, it may be provided that the server device nevertheless pushes such secondary resources. Two cases may happen. First, the server device may determine that it has received all the Bloom Filters describing the client cache (this assumes that the client device sets a flag for the last Bloom Filter it sends). In such case the client device has chosen not to describe part of its cache. Second, the server device may determine that it has not received all the Bloom Filters describing the client cache (or may not know if it is the case). In both cases, the server device may decide to push a secondary resource instead of moving it to the list of unchecked resources. The decision may be adapted to each case.

To perform this decision, the server device may compute an importance value using criteria such as those described above for filtering or splitting the resources (size, type, etc.). The level of importance used as a threshold for defining important resources, and thus to push them, can vary depending on the client device's type. For a desktop computer, it can be assumed that the browser cache is large, and therefore the threshold should be set to a high value. On the contrary, for a light device with few resources (such as a mobile phone), the browser cache is liable to be much smaller, and therefore the threshold can be set to a lower value.

If the concerned resource is determined as important, it is pushed to the client device, otherwise the server device waits for a specific request from the client device.

Also depending on the client device's type, the embedded browser may need more or less frequently to free some space in cache memories by removing cached resources. This makes it possible for the cache memories not to endlessly grow.

For example, the frequency of cache deletion in a PC-based browser is generally low compared to more resource constrained devices which thus require more frequent cache pruning operations.

This issue of cache management requires updating the cache information (Bloom filters) available at the server device. Otherwise, the server device will not have correct information for selecting which resources to push or not.

To achieve this updating operation, the client device may send again the Bloom filters describing its resources when deletions are scheduled and performed.

This may be done as described above when the client device first generates the Bloom filters. Based on the splitting information and the Bloom filter description, the server device is able to substitute the old ones with the corresponding new Bloom filters.

In particular, as the resources have changed in the client's cache memories, the size of the new Bloom filter for a given description may also have changed.

If the size is smaller, there is not difficulty. Possibly several Bloom filters can be sent in one message.

However, if the size is bigger, the new Bloom filter may not fit into a single request (in term of TCP segments). Therefore, it is possible to split the corresponding sub-list into two or more subgroups, each represented by its own Bloom filter and its description.

In this situation, when the server device receives a Bloom filter for which it has no previously received Bloom filter with the same description, it searches the list of its Bloom filter descriptions. If any description includes the received description, the corresponding Bloom filter is substituted with the new Bloom filter and the received description replaces the previous description. In this way, the first received Bloom filter replaces the previously received Bloom filters, and the following Bloom filters are added to the list.

Depending on the server device, policies may require to delete received cache information. This is for example the case if memory freeing policies are implemented. It may also be the case if the cache information in server's memory is too fragmented: there are too many Bloom filters representing some part of the client's cache.

Normally, the server device keeps the received cache information as long as the connection with the corresponding client device is kept. If a memory management policy requires the server device to delete some received cache information without closing the connection with the client device, the server device may send a message to the client device stating that the cache information was deleted, and that the client device needs to send it again with its next request, if needed.

In the case of fragmentation, the server issue may request the client device to send new cache information as soon as possible, without waiting for a new request to be sent.

In one particular embodiment of the invention enabling reduction of the number of cached resources to transmit to the server device, the method further comprises determining, in the first list of resources, a primary resource and secondary resources that are linked to the primary resource in the meaning that the rendering of the primary resource requires the secondary resources; and substituting, in the first list, the primary resource and the secondary resources with a virtual resource defining the primary and secondary resources.

In that case, any Bloom filter sent to the server device represents the availability of the virtual resource and not of each of the primary and secondary resources separately. This saves entries in the Bloom filters.

The virtual resource may be seen as a virtual or dummy resource since it does not exist as an actual single resource by its own, but as a virtual combination of several linked resources.

For example, a web page can reference a resource either directly (by including a link to it) or indirectly through another resource. For instance, a web page may directly reference a CSS document, which in turn references an image (used as background).

That particular embodiment provides that a resource and its associated secondary resources are represented as a whole in the cache information only.

To achieve this situation, the client device takes a resource, which is not the main resource for a web page (for example a CSS document), extracts all the secondary resources referenced by this resource.

It then removes secondary resources that are originated from a server device different from the one of the first resource.

Then, the client device creates a virtual or dummy resource having as metadata the ones of the first resource (e.g. its URI, its cache information, its type), and having as content the content of this first resource concatenated with the content of each of the kept secondary resources.

In particular, the concatenation should be done using a predefined order, such as the referencing order (it could also be by sorting the resources based on their URIs).

The cache validity information of the virtual or dummy resource is either the one from the first resource, or the minimum from the first resource and its secondary resources.

When sending cache information to the server device, the client device thus replaces the first resource and its secondary resources by this new virtual or dummy resource.

On its side, the server device performs the same operations: it handles this first resource and its secondary resources as a whole. As a consequence, the server device checks the Bloom filters using the virtual or dummy resource.

But when pushing the virtual or dummy resource because it is determined that it is missing at the client device, the server device should pushes all resources defined by this virtual or dummy resource.

However, adaptation to handle the case where part of the secondary resources defined by virtual or dummy resource is missing may be provided to avoid pushing all the resources.

For example, if the virtual or dummy resource is not entirely cached by the client device, each secondary resource of the virtual or dummy resource that is present in the client's cache may be added individually to the cache information (i.e. in a Bloom filter). As a consequence, the server device first checks whether the virtual or dummy resource is represented by the Bloom filters. If this is not the case, it checks each secondary resource individually to determine which one to send.

Above, it has been described the sending of cache information from a client device to a server device, mainly at the client's own initiative. However, in some embodiments, the server device may provide the client device with some indication about server-side specificities that could impact the content of cache information.

The explanations below, either partly or entirely, may be implemented in cooperation with what has been described previously.

For example, the server device may not be configured to handle such cache information. To handle such situation, the following operations may be implemented.

When receiving a request containing client's cache information, the server device can notify the client device whether it supports, or not, using such information for pushing resources to the client. Such notification can be realized using a response header, such as: Cache-Representation-Support: 1

A value of 0 for this header means that the server device does not support using cache information.

A client device receiving this header with a value of 1 infers that the server device supports cache information according to the invention. It may thus take advantage of the information to decide to continue sending such cache information to the server device.

But, a client device receiving this header with a value of 0 infers that the server device does not support cache information according to the invention. The client device receiving a response without this header also knows that the server device does not support the invention. In both case, the client device may stop sending cache information to the server device, to save network bandwidth.

Another example regards the characteristics the server device requires for the cache information.

In particular, the server device may request the client device about specific characteristics of the cache information to be sent to it. For example, it may require a specific number of bits per resource in the representation, either for requiring a maximal error rate value, or for keeping the same set of hash functions for all the client devices.

This information can be described in a header sent by the server device, for example: Cache-Representation-Bits: 17

The server device may also require some specific set of criteria for filtering or splitting the resources.

For example, a photo-sharing web site where all the photos are loaded dynamically from JavaScript would require that only JavaScript and CSS resources are included in the client's cache information. As another example, a web site may know that some of its web pages are loaded quicker if the JavaScript resources are received first, while some others are loaded quicker if the CSS resources are received first.

Such information can be described in a dedicated header. It can either target the whole web site or a part of it or a given web page. It can describe either the filtering criteria or the splitting criteria or both.

For web sites with different filtering/splitting criteria for different web pages, the information can be described in a specific resource, which is referred from a header. For example, for keeping only JavaScript and CSS resources i.e. filtering criteria), the header can be: Cache-Representation-Filter: type=js, css. For splitting first by JavaScript, then by CSS, the header can be: Cache-Representation-Splitting: type=css, js To optimize push of resources, the server device may configure a web page (served to the client devices) to be able to obtain measurements about the loading time of that web page.

This may consist for example in adding some JavaScript code snippets for obtaining the loading time on the client side and transmitting it back to the server device.

Based on the loading times obtained using such snippets, the server device can test several possibilities for the order to use for pushing resources.

Using the measurements received from the client devices, the server is thus able to compute statistics and to determine which order is the best for serving a web page and its secondary resources.

It is to be noted that the statistics can either be gathered per web page, or per group of similar web pages.

The statistics can also discriminate between different browsers (possibly different browser versions), between different client operating systems, and/or between different types of network connection . . . .

Once enough statistics are obtained, the snippets can be removed from the web page.

The strategy inferred by the server device from the statistics may also be transmitted to the client device, for example by defining an order of filtering and/or splitting criteria.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of communication between a local communication client device and a remote communication server device in a client-server system, the method comprising, at the local communication client device:
  requesting a web page from the remote communication server device;
  receiving the requested web page from the remote communication server device;
  receiving secondary digital resources referenced in the requested web page, the secondary digital resources being pushed by the remote communication server device on a server's own initiative;
  the method further comprising at the local communication client device, before requesting the web page:
  obtaining a first list of digital resources available in cache memories of the local communication client device;
  filtering the first list according to at least one filtering criterion relating to a resource parameter, to obtain a filtered list of fewer digital resources available in the local communication client device; and
  adding at least one data structure representing the filtered list of digital resources to the request for obtaining the web page, so to notify the remote communication server device with the availability of resources in the cache memories of the local communication client device.

2. The method of claim 1, further comprising splitting the filtered first list according to at least one splitting criterion relating to a resource parameter, to obtain a plurality of sub-lists of digital resources available in the local communication client device, wherein the step of adding at least one data structure representing the filtered list of digital resources includes adding data structures, each representing a respective sub-list of digital resources, to the request for obtaining the web page, so to notify the remote communication server device with the availability of digital resources in the cache memories of the local communication client device.

3. The method of claim 1, wherein the at least one filtering criterion comprises at least one of the device of origin of the digital resource, the cache validity information and the information relating to a link between the digital resource and a primary resource.

4. The method of claim 1, wherein any subsequent data structure to notify the digital resources available at the local communication client device is included in a subsequent request for obtaining a secondary resource from the remote communication server device, wherein the secondary resource is referenced by the web page received in response to the request for the web page.

5. The method of claim 1, further comprising obtaining a size of a request for the web page; obtaining a maximum request size function of a communication network between the local communication client device and the remote communication server device; determining a size available to transmit a first one of the data structures by a difference between the obtained request size and the maximum request size; and splitting the first list according to at least one splitting criterion relating to a resource parameter, to obtain a plurality of sub-lists of digital resources available in the local communication client device; wherein the splitting into sub-lists is also a function of the determined available size.

6. The method of claim 5, wherein the first list to split is first sorted according to the at least one splitting criterion and then split according to the determined available size.

7. The method of claim 1, further comprising determining, in the first list, a primary digital resource and secondary digital resources that are linked to the primary digital resource in the meaning that the rendering of the primary digital resource requires the secondary digital resources; and substituting, in the first list, the primary digital resource and the secondary digital resources with a virtual resource defining the primary and secondary digital resources; wherein the at least one data structure represents the availability of the virtual resource and not of each of the primary and secondary digital resources separately.

8. A method of communication between a local communication client device and a remote communication server device in a client-server system, the method comprising, at the local communication client device:
  requesting a web page from the remote communication server device;
  receiving the requested web page from the remote communication server device;
  receiving secondary digital resources referenced in the requested web page, the secondary digital resources being pushed by the remote communication server device on a server's own initiative;
  the method further comprising at the local communication client device, before requesting the web page:

obtaining a first list of digital resources available in cache memories of the local communication client device;

splitting the first list according to at least one splitting criterion relating to a resource parameter, to obtain a plurality of sub-lists of digital resources available in the local communication client device; and adding data structures, each representing a respective sub-list of digital resources, to the request for obtaining the web page, so to notify the remote communication server device with the availability of digital resources in the cache memories of the local communication client device.

9. The method of claim 8, wherein the splitting provides an ordered plurality of sub-lists according to the at least one splitting criterion and the data structures are added, and notified to the remote communication server device, according to the order of their respective sub-lists in the ordered plurality.

10. The method of claim 8, wherein the at least one splitting criterion comprises at least one of the digital resource type and size.

11. The method of claim 8, wherein any subsequent data structure to notify the digital resources available at the local communication client device is included in a subsequent request for obtaining a secondary resource from the remote communication server device, wherein the secondary resource is referenced by the web page received in response to the request for the web page.

12. The method of claim 8, further comprising obtaining a size of a request for the web page; obtaining a maximum request size function of a communication network between the local communication client device and the remote communication server device; and determining a size available to transmit a first one of the data structures by a difference between the obtained request size and the maximum request size; wherein the splitting into sub-lists is also a function of the determined available size.

13. The method of claim 8, further comprising determining, in the first list, a primary digital resource and secondary digital resources that are linked to the primary digital resource in the meaning that the rendering of the primary digital resource requires the secondary digital resources; and substituting, in the first list, the primary digital resource and the secondary digital resources with a virtual resource defining the primary and secondary digital resources; wherein the data structure(s) represent(s) the availability of the virtual resource and not of each of the primary and secondary digital resources separately.

14. A local communication client device for communicating with a remote communication server device in a client-server system, the local communication client device comprising:

a request unit for requesting a web page from the remote communication server device;

at least one receiving unit that operates to: (i) receive the requested web page from the remote communication server device; and (ii) receive secondary digital resources referenced in the requested web page, the secondary digital resources being pushed by the remote communication server device on a server's own initiative;

cache memories storing digital resources;

a resource collector for obtaining a first list of digital resources available in the cache memories;

a resource filter for filtering the first list according to at least one filtering criterion relating to a resource parameter, to obtain a filtered list of fewer digital resources available in the local communication client device; and an adding and notifying module for adding at least one data structure representing the filtered list of digital resources to the request for the web page, so to notify the remote communication server device of the client-server system with the availability of digital resources in the cache memories of the local communication client device, wherein the resource collector, the resource filter and the adding and notifying module operate before the request unit requests the web page.

15. The local communication client device of claim 14, further comprising a resource splitter for splitting the first list according to at least one splitting criterion relating to a resource parameter, to obtain a plurality of sub-lists of digital resources available in the local communication client device, wherein the resource splitter is arranged to split the filtered list obtained from the resource filter and wherein at least one of: (i) the adding of at least one data structure representing the filtered list of digital resources by the adding and notifying module includes adding data structures, each representing a respective sub-list of digital resources, to the request for the web page, so to notify the remote communication server device of the client-server system with the availability of digital resources in the cache memories of the local communication client device; and (ii) the adding and notifying module further operates to add data structures, each representing a respective sub-list of digital resources, to the request for the web page, so to notify the remote communication server device of the client-server system with the availability of digital resources in the cache memories of the local communication client device.

16. The communication device of claim 14, wherein the at least one filtering criterion of the resource filter comprises at least one of the device of origin of the digital resource, the cache validity information and the information relating to a link between the digital resource and a primary resource.

17. A local communication client device for communicating with a remote communication server device in a client-server system, the local communication client device comprising:

a request unit for requesting a web page from the remote communication server device;

at least one receiving unit that operates to: (i) receive the requested web page from the remote communication server device; and (ii) receive secondary digital resources referenced in the requested web page, the secondary digital resources being pushed by the remote communication server device on a server's own initiative;

cache memories storing digital resources;

a resource collector for obtaining a first list of digital resources available in the cache memories;

a resource splitter for splitting the first list according to at least one splitting criterion relating to a resource parameter, to obtain a plurality of sub-lists of digital resources available in the local communication client device; and an adding and notifying module for adding data structures, each representing a respective sub-list of digital resources, to the request for the web page, so to notify the remote communication server device of the client-server system with the availability of digital resources in the cache memories of the local communication client device, wherein the resource collector, the resource splitter and the adding and notifying module operate before the request unit requests the web page.

18. The local communication client device of claim 17, wherein the resource splitter is configured to provide an ordered plurality of sub-lists according to the at least one splitting criterion; and wherein the adding and notifying module adds, and notifies to the remote communication server device, the data structures according to the order of their respective sub-lists in the ordered plurality.

* * * * *